US012572057B2

(12) United States Patent
Yoon et al.

(10) Patent No.: US 12,572,057 B2
(45) Date of Patent: Mar. 10, 2026

(54) CAMERA MODULE

(71) Applicant: LG INNOTEK CO., LTD., Seoul (KR)

(72) Inventors: Kyeong Mok Yoon, Seoul (KR); Min Woo Lee, Seoul (KR); Seung Man Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/773,109

(22) Filed: Jul. 15, 2024

(65) Prior Publication Data

US 2024/0369912 A1 Nov. 7, 2024

Related U.S. Application Data

(63) Continuation of application No. 18/010,240, filed as application No. PCT/KR2021/007168 on Jun. 8, 2021, now Pat. No. 12,072,611.

(30) Foreign Application Priority Data

Jun. 19, 2020 (KR) ........................ 10-2020-0075219

(51) Int. Cl.
    *G03B 17/08* (2021.01)
    *G03B 17/55* (2021.01)

(52) U.S. Cl.
    CPC ............. *G03B 17/08* (2013.01); *G03B 17/55* (2013.01)

(58) Field of Classification Search
    CPC ................................ G03B 17/08; G03B 17/55
    See application file for complete search history.

(56) References Cited

U.S. PATENT DOCUMENTS

| | | | |
|---|---|---|---|
| 10,674,049 B2 | 6/2020 | Zhang et al. | |
| 10,771,661 B2 | 9/2020 | Park et al. | |
| 11,221,543 B2 | 1/2022 | Park | |
| 12,072,611 B2 * | 8/2024 | Yoon ...................... H04N 23/57 | |
| 2006/0171704 A1 * | 8/2006 | Bingle ...................... B60R 1/04 | |
| | | | 396/419 |
| 2011/0279675 A1 | 11/2011 | Mano et al. | |
| 2011/0298925 A1 * | 12/2011 | Inoue ...................... H04N 23/52 | |
| | | | 348/148 |
| 2016/0062110 A1 | 3/2016 | Kasihma et al. | |
| 2016/0212308 A1 | 7/2016 | Ahn et al. | |
| 2019/0028620 A1 | 1/2019 | Park | |
| 2019/0208577 A1 | 7/2019 | Chien | |
| 2020/0116994 A1 | 4/2020 | Gu et al. | |
| 2020/0120193 A1 * | 4/2020 | Ha ...................... H04M 1/0249 | |

(Continued)

FOREIGN PATENT DOCUMENTS

| | | | |
|---|---|---|---|
| CN | 1744621 A * | 3/2006 | |
| CN | 102308571 A | 1/2012 | |

(Continued)

*Primary Examiner* — Stephanie E Bloss
*Assistant Examiner* — Diana Hancock
(74) *Attorney, Agent, or Firm* — Birch, Stewart, Kolasch & Birch, LLP

(57) ABSTRACT

A camera module includes a first body including a lens; a second body coupled to the first body, and including a hole; and a shield cover disposed within the second body. The shield cover is adhered to the second body. A portion of a side plate of the shield cover is exposed by means of the hole of the second body.

19 Claims, 30 Drawing Sheets

(56)     References Cited

U.S. PATENT DOCUMENTS

2023/0244125 A1     8/2023   Lee et al.
2023/0362466 A1*   11/2023   Yoon ...................... G03B 17/02

FOREIGN PATENT DOCUMENTS

| | | |
|---|---|---|
| CN | 106537244 A | 3/2017 |
| CN | 107145025 A | 9/2017 |
| CN | 107783356 A | 3/2018 |
| CN | 108012067 A | 5/2018 |
| CN | 208143324 U | 11/2018 |
| EP | 2 393 277 B1 | 8/2015 |
| EP | 3 572 769 A1 | 11/2019 |
| JP | 2007-22354 A | 2/2007 |
| JP | 2014-11565 A | 1/2014 |
| JP | 2017-147648 A | 8/2017 |
| KR | 10-2010-0123010 A | 11/2010 |
| KR | 10-2016-0088098 A | 7/2016 |
| KR | 10-2017-0084550 A | 7/2017 |
| KR | 10-2018-0045619 A | 5/2018 |
| KR | 10-2018-0053895 A | 5/2018 |
| KR | 10-2019-0004457 A | 1/2019 |
| KR | 10-2020-0108153 A | 9/2020 |
| TW | 201915585 A | 4/2019 |
| WO | WO 2019/107958 A1 | 6/2019 |

* cited by examiner

CAMERA MODULE

CROSS REFERENCE TO RELATED APPLICATIONS

This application is a Continuation of U.S. application Ser. No. 18/010,240 filed on Dec. 14, 2022, which is the National Phase of PCT/KR2021/007168 filed on Jun. 8, 2021, which claims priority under 35 U.S.C. § 119 (a) to Patent Application No. 10-2020-0075219 filed in the Republic of Korea on Jun. 19, 2020, all of which are hereby expressly incorporated by reference into the present application.

TECHNICAL FIELD

The present embodiment relates to a camera module.

BACKGROUND ART

Recently, ultra-small camera modules are being developed, and ultra-small camera modules are widely used in small electronic products such as smartphones, laptops, and game consoles.

As the spread of automobiles becomes more popular, ultra-small cameras are widely used not only in small electronic products but also in vehicles. For example, black box cameras for vehicle protection or objective data of traffic accidents, rear surveillance cameras that allow drivers to monitor blind spots at the rear of the vehicle through screens to ensure safety when reversing the vehicle, and peripheral detection cameras capable of monitoring the surroundings of the vehicle, and the like are provided.

Recently, as the camera module has become high-pixel, the heat dissipation performance of the plastic body has become a problem. In particular, the conventional plastic body has a lower unit price than a metal body, however, is vulnerable to heat dissipation, so that a high-pixel camera module has a problem in that the product is deteriorated as it is used.

DETAILED DESCRIPTION OF THE INVENTION

Technical Subject

The present invention is intended to provide a camera module capable of maximizing heat dissipation performance and minimizing a waterproof problem.

In addition, the present invention is intended to provide a camera module that minimizes assembly man-hours and reduces costs.

Technical Solution

A camera module according to the present invention comprises: a first body including a lens; a second body being coupled to the first body and including a hole; and a shield cover being disposed in the second body, wherein the shield cover is attached to the second body, and a portion of a side plate of the shield cover may be exposed by the hole of the second body.

The second body includes a bottom plate and a side plate being extended from the bottom plate in a direction toward the first body, wherein the side plate of the second body includes a first region being attached to the shield cover, and a second region not being attached to the shield cover and the first body, and wherein the thickness of the second region of the second body may be greater than the thickness of the first region of the second body.

An inner side surface of the second region of the side plate of the second body may be protruded more inward than an inner side surface of the first region of the side plate of the second body.

An inner side surface of the first region and an inner side surface of the second region of the side plate of the second body may include a step structure.

The shield cover includes a bottom plate being disposed in the bottom plate of the second body, and a side plate being disposed in the side plate of the first body, wherein the side plate of the shield cover may be disposed in the first region of the second body.

The sum of the thickness of the side plate of the shield cover and the thickness of the first region of the side plate of the second body may be greater than the thickness of the second region.

An inner side surface of the side plate of the shield cover may be protruded more inward than an inner side surface of the first region of the side plate of the second body.

The thickness of the side plate of the shield cover may be thinner than the thickness of the second region of the side plate of the second body.

The width between inner side surfaces of the first region of the second body facing each other may be greater than the width between inner side surfaces of the second region of the second body facing each other.

The second body includes a bottom plate and a side plate being extended from the bottom plate; the hole of the second body includes a first hole being formed in the bottom plate of the second body, and a second hole being formed in the side plate of the second body; and the shape of the first hole may be different from the shape of the second hole.

The side plate of the second body includes: a first side plate; a second side plate; a third side plate being disposed at an opposite side of the first side plate; and a fourth side plate being disposed at an opposite side of the second side plate, wherein a plurality of the second holes are formed in each of the first to fourth side plates, wherein the second hole is disposed in a direction perpendicular to the optical axis, and wherein the length of the first side plate in a direction perpendicular to the optical axis direction may be 1.5 to 2.5 times the sum of the lengths of the plurality of second holes formed in the first side plate in a direction perpendicular to the optical axis.

The cross-sectional area of the first side plate may be 3 to 5 times the total area of the plurality of second holes formed in the first side plate.

The second body includes a bottom plate and a side plate being extended from the bottom plate, wherein the shield cover includes a bottom plate being disposed in the bottom plate of the second body, and a side plate being extended from the bottom plate of the shield cover and being disposed on the side plate of the second body, wherein at least a portion of the bottom plate of the shield cover is exposed by the first hole of the second body, and wherein at least a portion of the side plate of the shield cover may be exposed through the second hole of the second body.

The board assembly may include: a first substrate being coupled to the first body; a second substrate being disposed below the first substrate; a spacer separating the first substrate and the second substrate; and a third substrate electrically connecting the first substrate and the second substrate.

It may include a heat dissipation member being disposed inside the shield cover and being disposed between the shield cover and the spacer.

The shield cover may be insert-injected into the second body.

The second body may be formed of a plastic material, and the shield cover may be formed of a metal material.

The camera module according to this embodiment includes: a first body including a lens; a second body being coupled to the first body; and a shield cover being disposed inside the second body and being coupled to the second body, wherein the second body includes a bottom surface and an inner side surface being connected to the bottom surface and including a step, wherein the shield cover includes a bottom plate being coupled to the bottom surface and a side plate being coupled to an inner side surface of the second body, and wherein at least a portion of the upper surface of the side plate of the shield cover may be coupled to the step of the inner side surface of the second body.

The shield cover and the second body may be coupled to be waterproof.

The camera module according to this embodiment includes: a first body including a lens; a second body being coupled to the first body; and a shield cover being disposed in the second body and being coupled to the second body, wherein the shield cover is coupled to the second body to be waterproof, and wherein the second body may include a plurality of holes formed to dissipate heat of the shield cover.

Advantageous Effects

Through the present invention, it is possible to provide a plastic rear body structure capable of maximizing heat dissipation.

In addition, it is possible to minimize assembly man-hours and reduce costs by assembling the shield cover made of a metal material and the rear body made of a plastic material by insert injection.

In addition, it is possible to prevent interfacial separation between the shield cover and the rear body through a pretreatment process on the shield cover, thereby maximizing the waterproof performance.

In addition, it is possible to improve the waterproof and heat dissipation performance while miniaturizing the camera module by disposing and contacting the shield cover on an inner surface of the rear body.

BRIEF DESCRIPTION OF DRAWINGS

Figure 14:
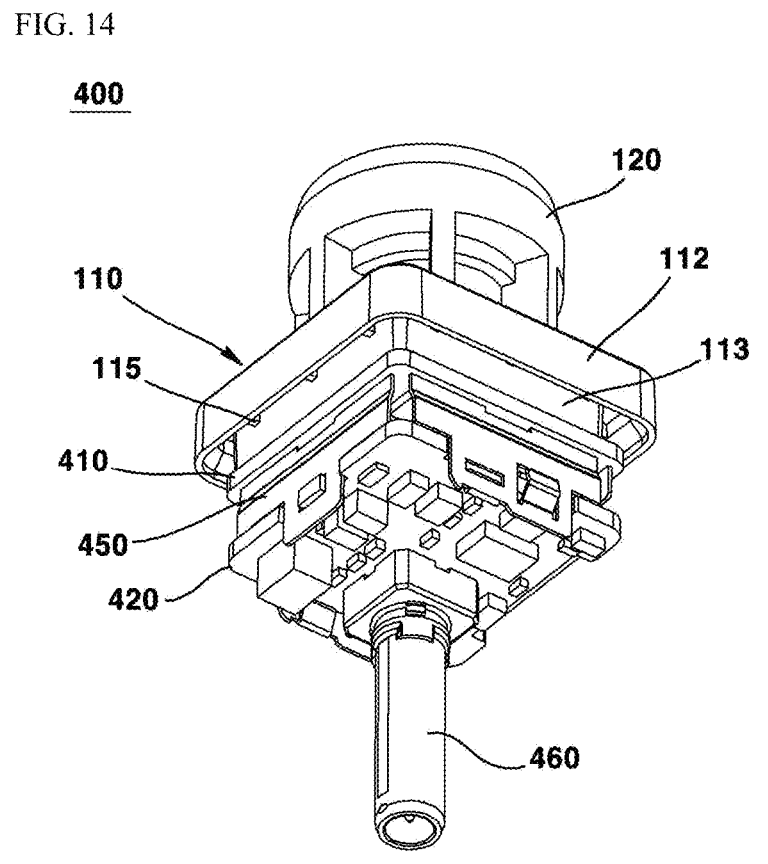

FIG. 14 is a perspective view illustrating a coupling relationship between a first body and a substrate assembly of a camera module according to an embodiment of the present invention.

EMBODIMENT

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

Hereinafter, an embodiment of the present invention will be described in more detail with reference to the accompanying drawings.

Figure 1:
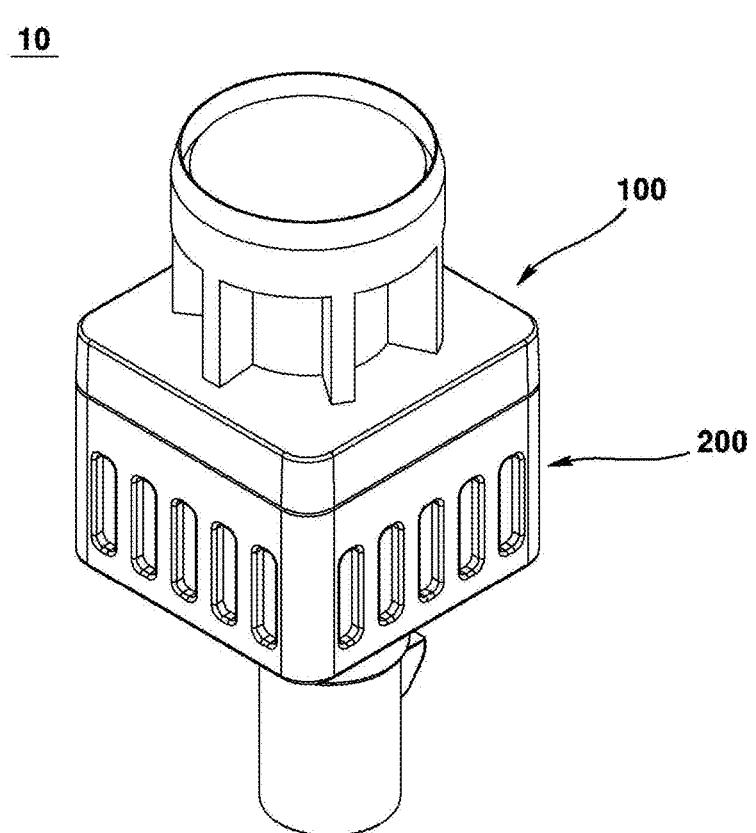
FIG. 1 is a perspective view of a camera module according to an embodiment of the present invention.
Figure 2:
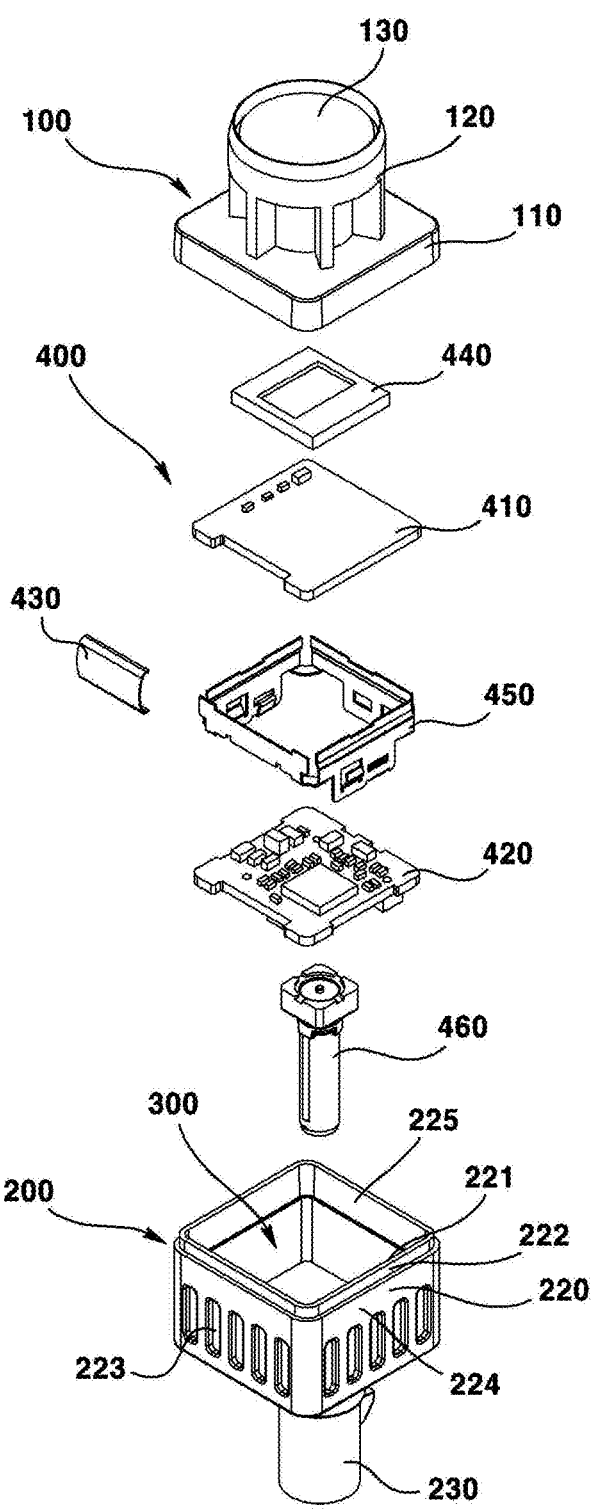
FIG. 2 is an exploded perspective view of a camera module according to an embodiment of the present invention.
Figure 3:
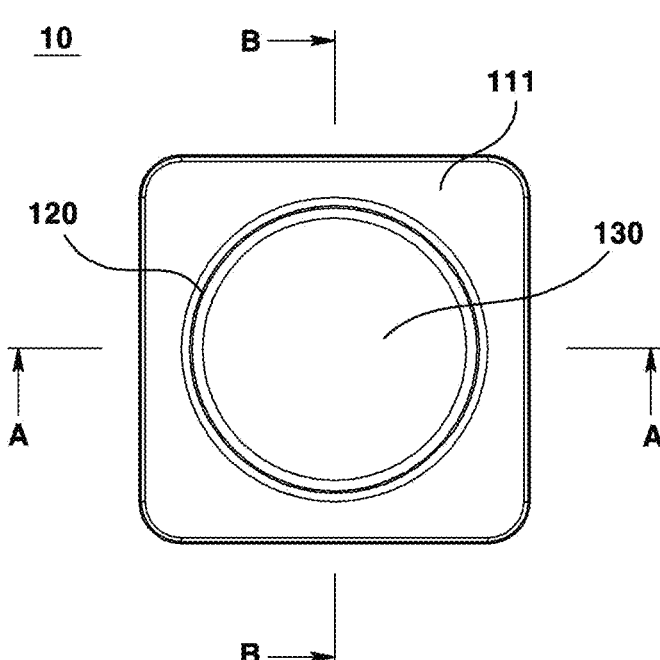
FIG. 3 is a front view of a camera module according to an embodiment of the present invention.
Figure 4:
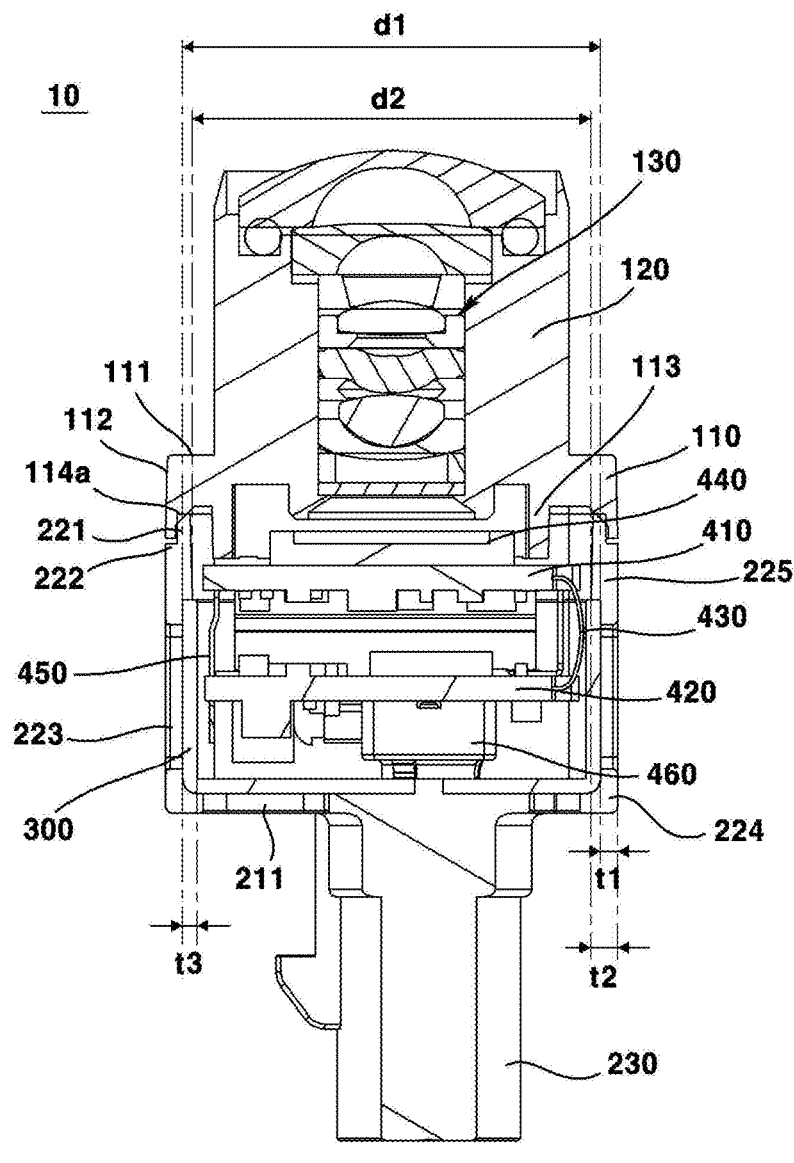
FIG. 4 is a cross-sectional view taken along line A-A of FIG. 3.
Figure 5:
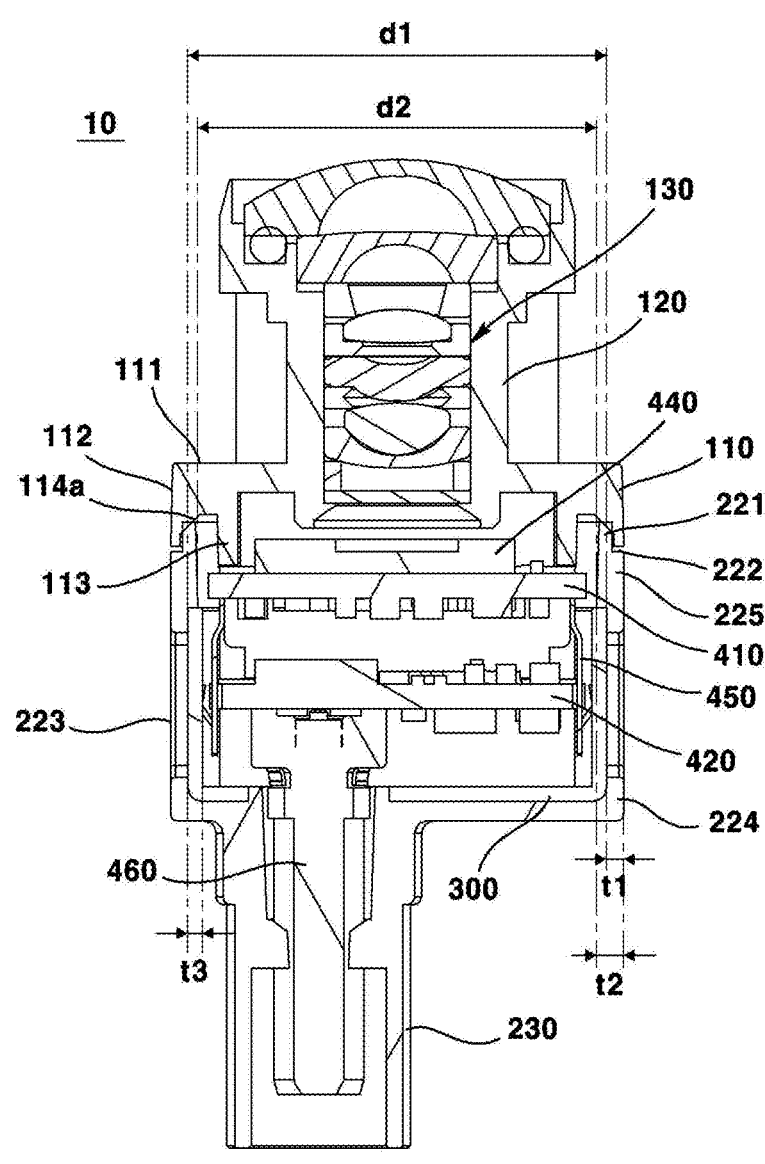
FIG. 5 is a cross-sectional view taken along line B-B of FIG. 3.
Figure 6:
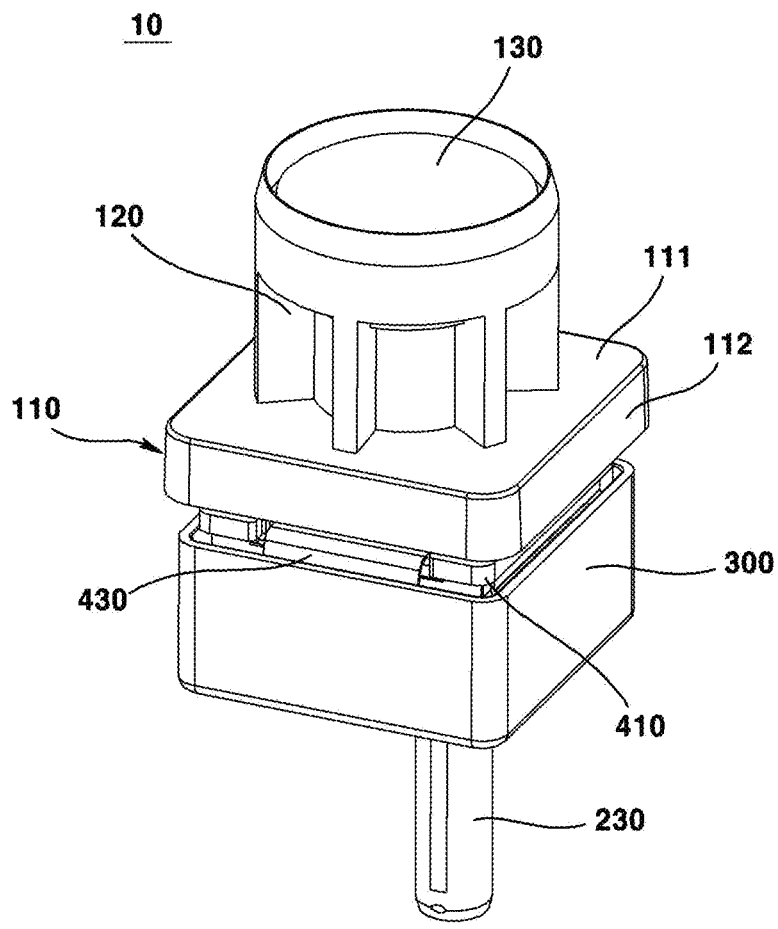
FIG. 6 is a perspective view of a camera module with a second body thereof removed according to an embodiment of the present invention.
Figure 7:
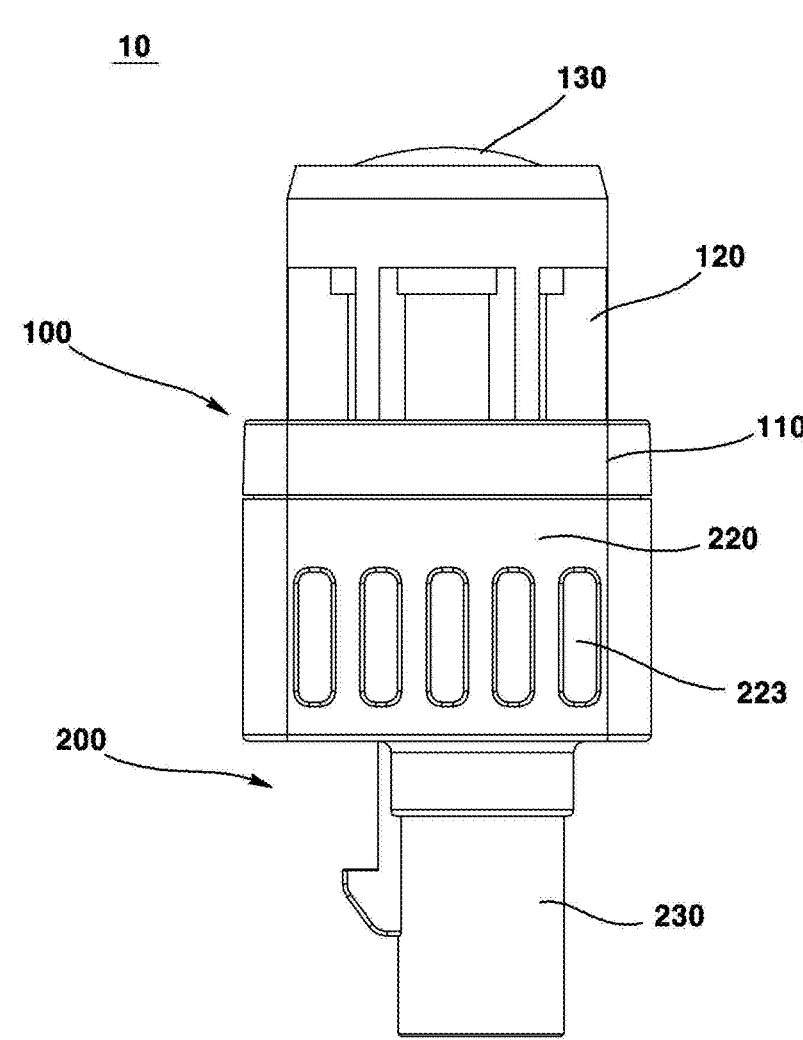
FIG. 7 is a side view of a camera module according to an embodiment of the present invention.
Figure 8:
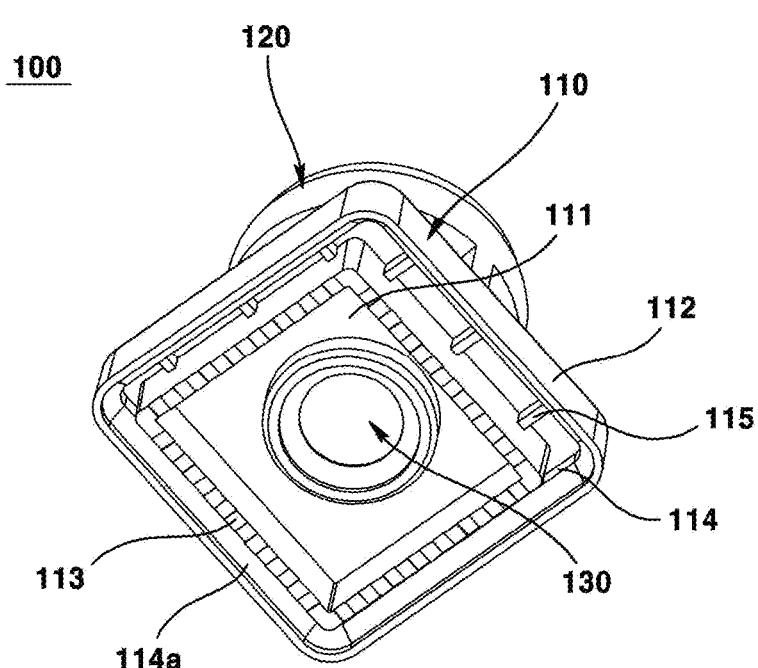
FIG. 8 is a perspective view of a first body of a camera module according to an embodiment of the present invention.
Figure 9:
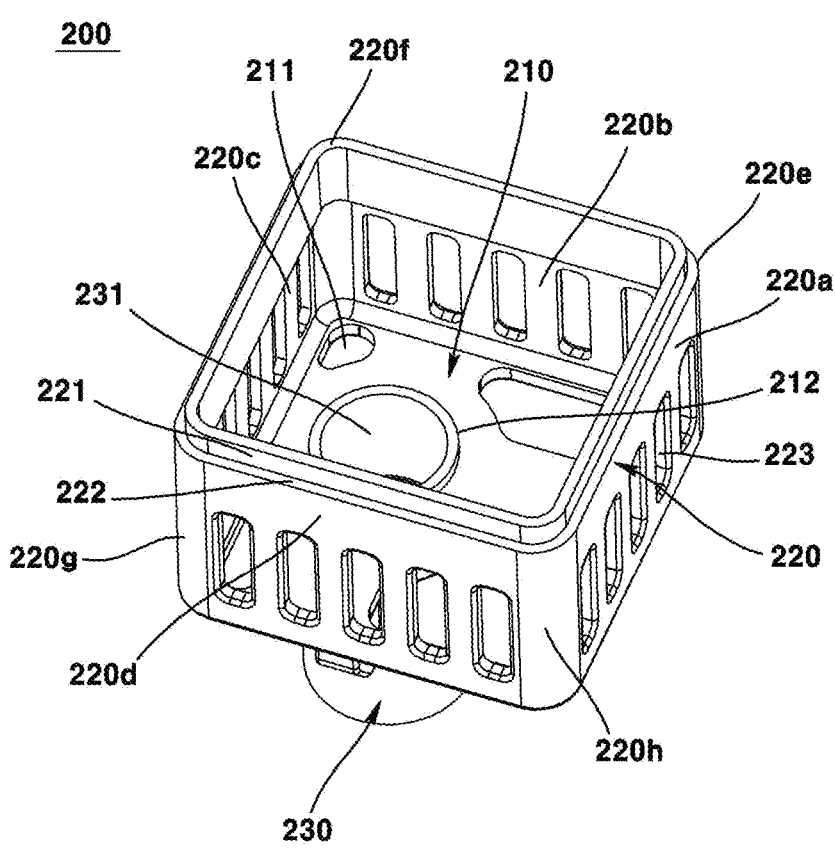
FIG. 9 is a perspective view of a second body of a camera module according to an embodiment of the present invention.
Figure 10:
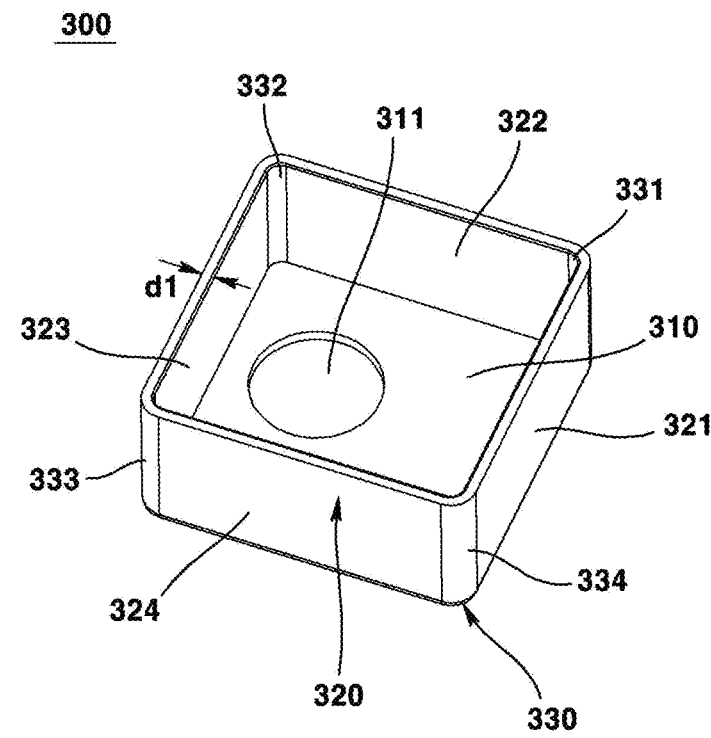
FIG. 10 is a perspective view of a shield cover of a camera module according to an embodiment of the present invention.
Figure 11:
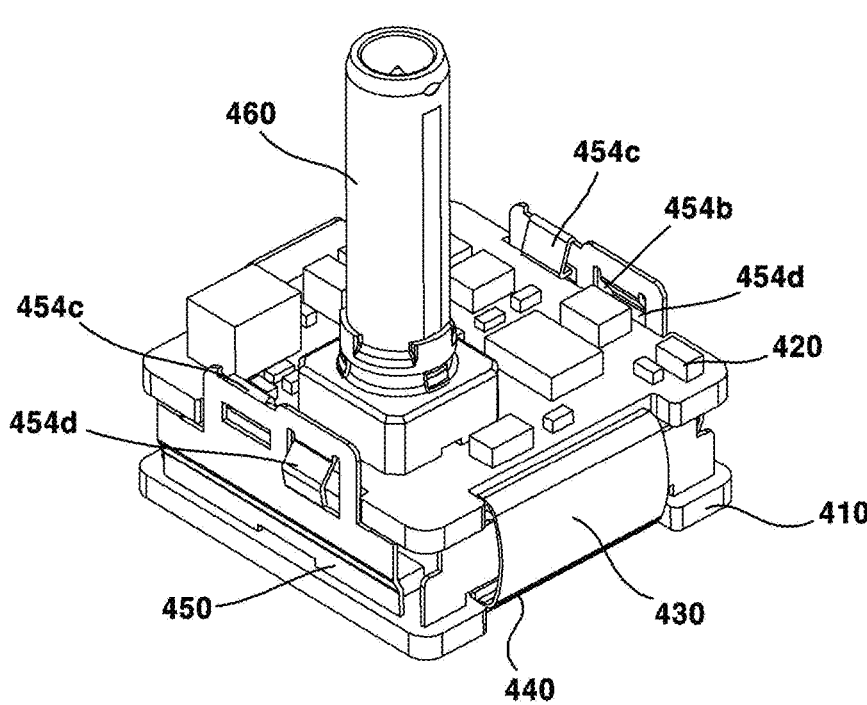
FIG. 11 is a perspective view of a substrate assembly of a camera module according to an embodiment of the present invention.
Figure 12:
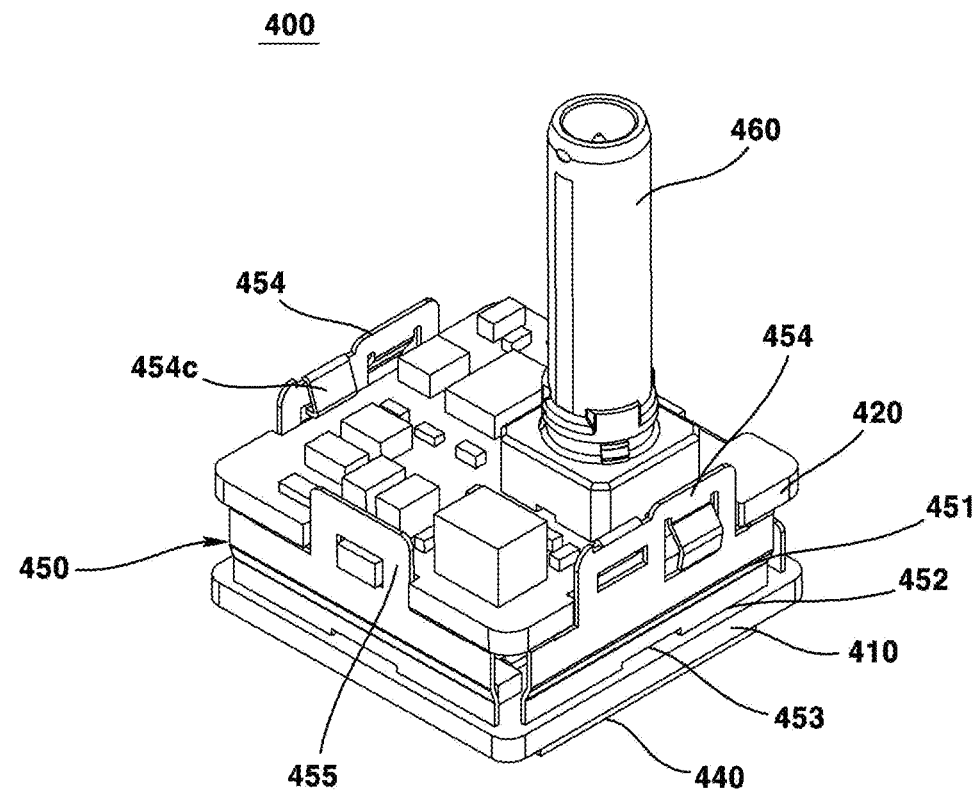
FIG. 12 is a perspective view of the substrate assembly of FIG. 11 viewed from another angle.
Figure 13:
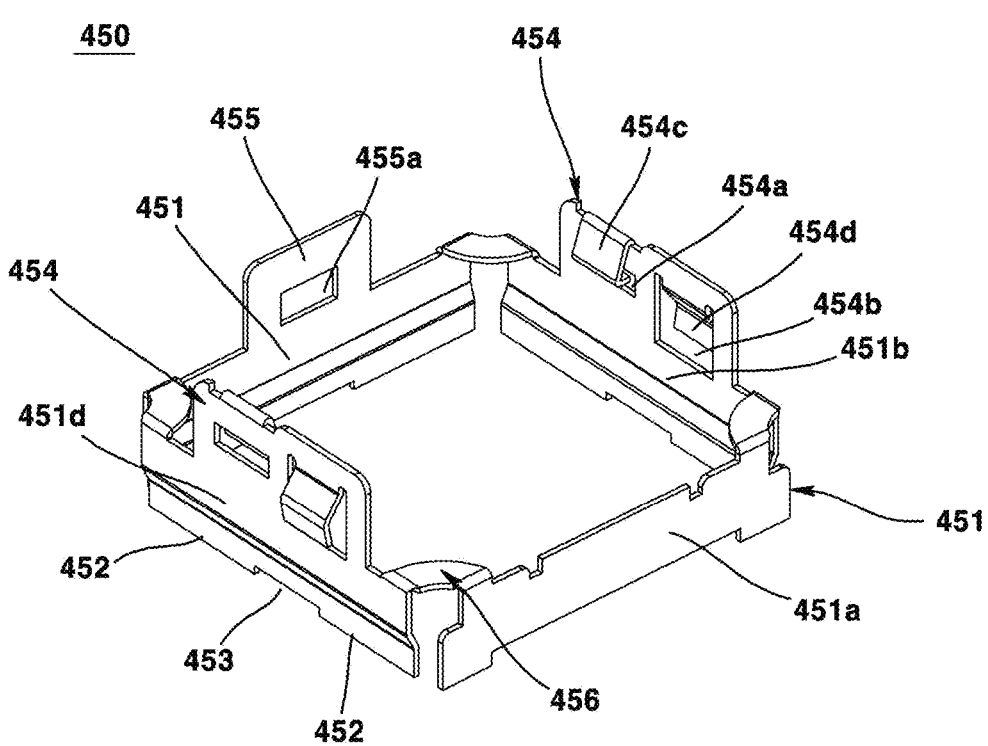
FIG. 13 is a perspective view of a spacer of a camera module according to an embodiment of the present invention.
Figure 15:
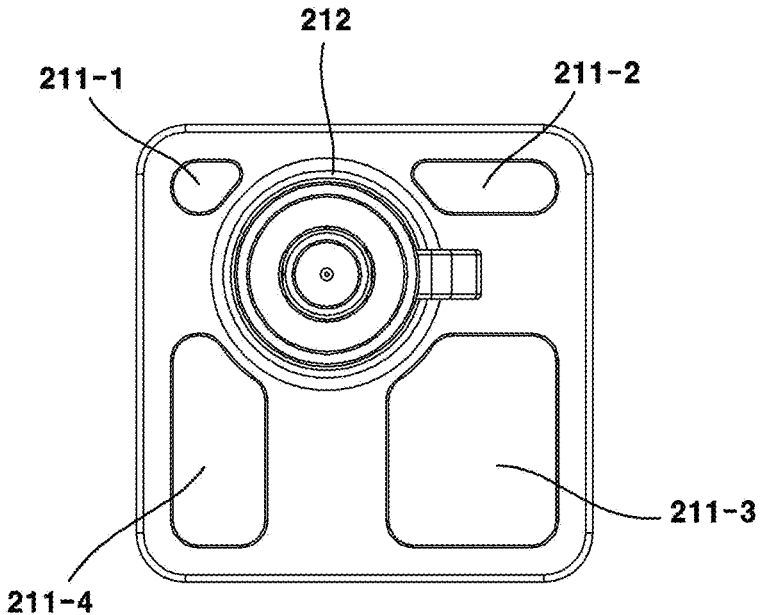
FIG. 15 is a rear view of a camera module according to an embodiment of the present invention.
Figure 16:
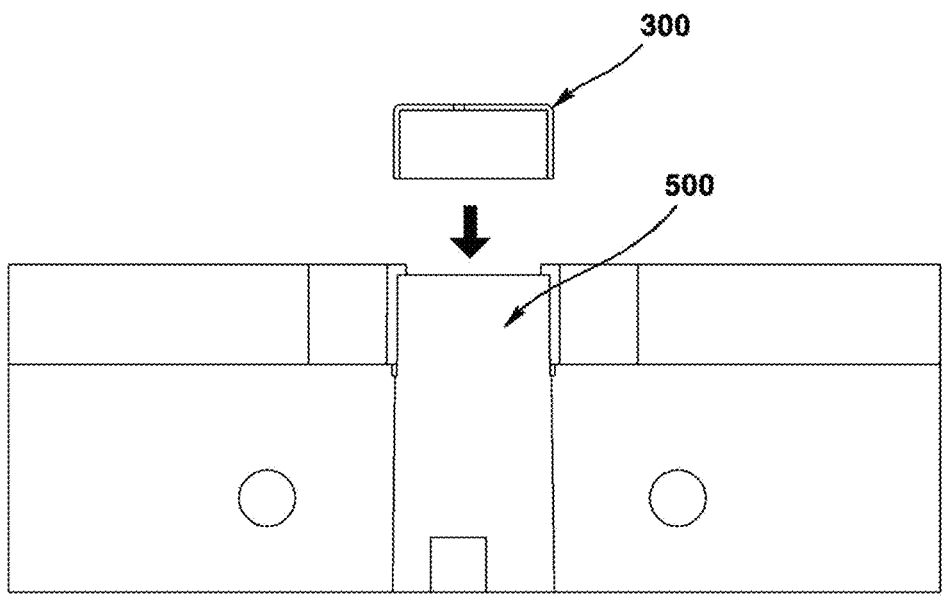
FIGS. 16 to 18 are views illustrating a manufacturing process of a shield cover of a camera module according to an embodiment of the present invention.
Figure 17:
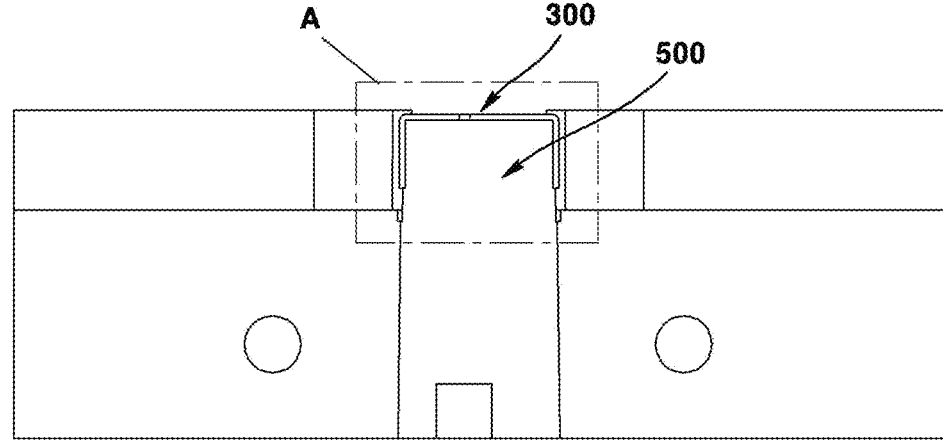
Figure 18:
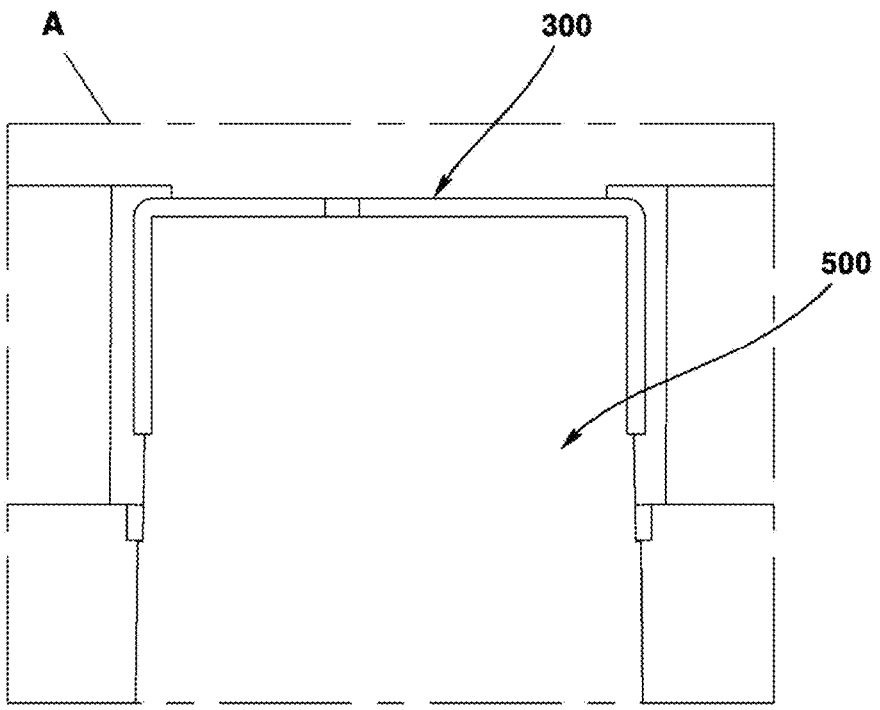
Figure 19:
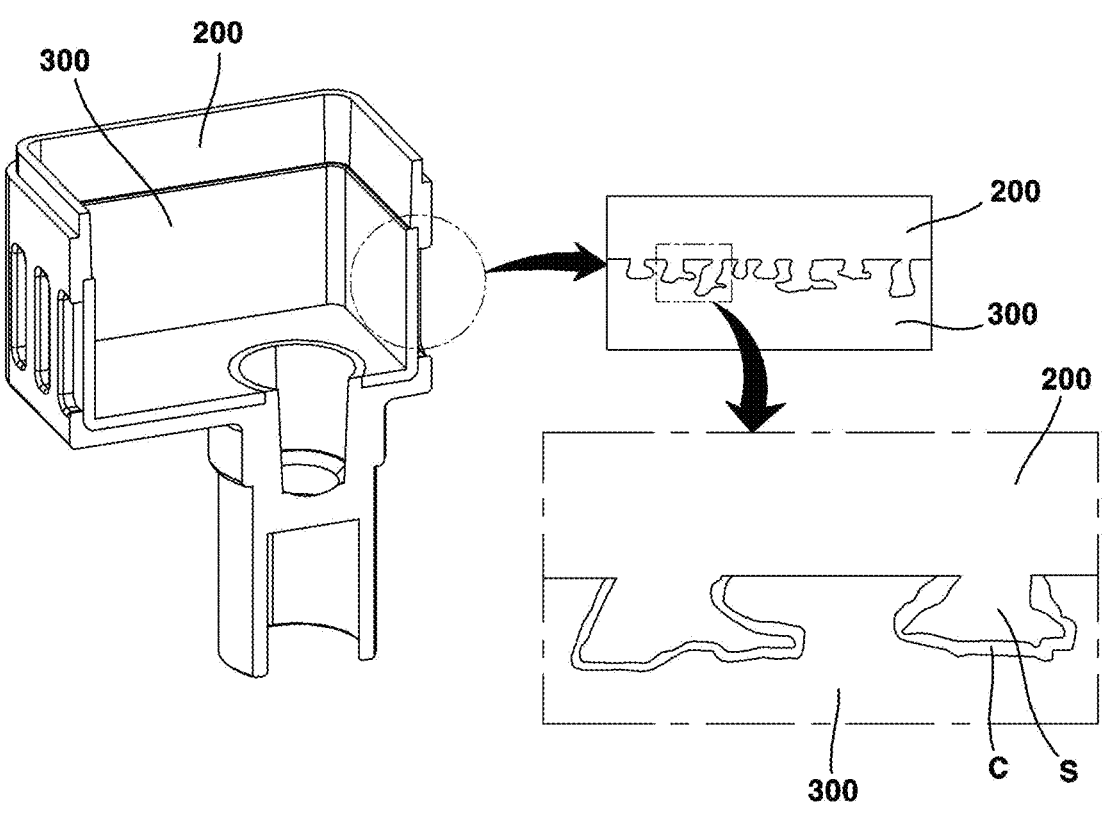
FIG. 19 is a view illustrating a coupling surface between the shield cover and the second body of the camera module according to an embodiment of the present invention.
Figure 20:
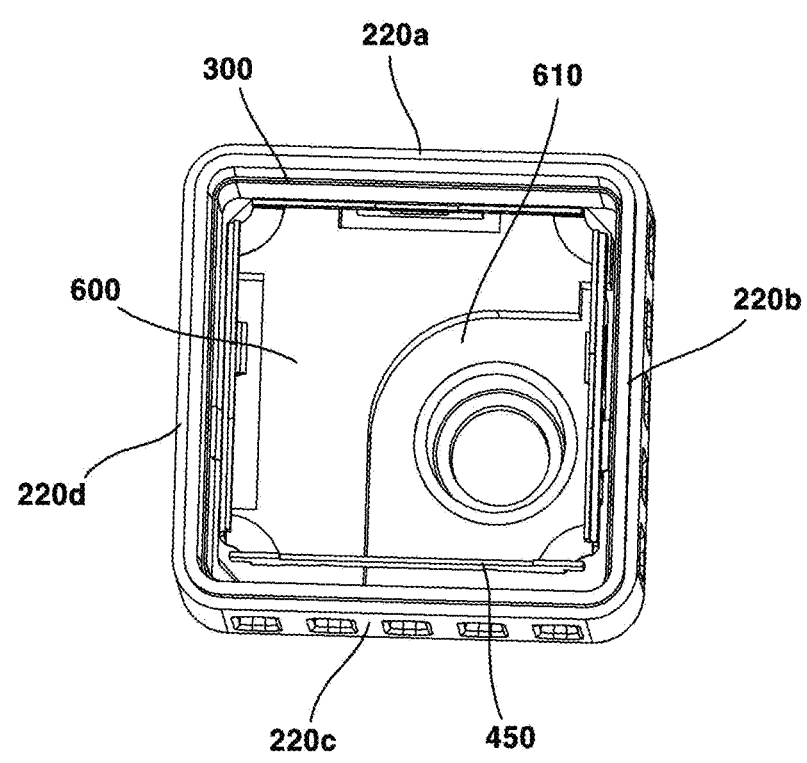
FIGS. 20 to 22 are views additionally illustrating a heat dissipation member of a camera module according to an embodiment of the present invention.
Figure 21:
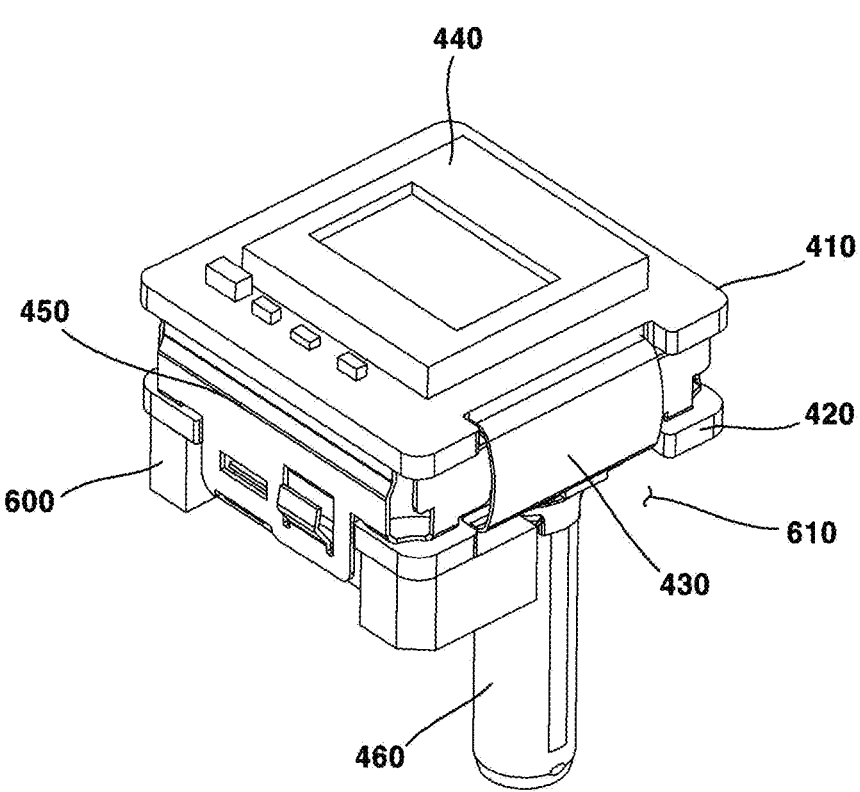
Figure 22:
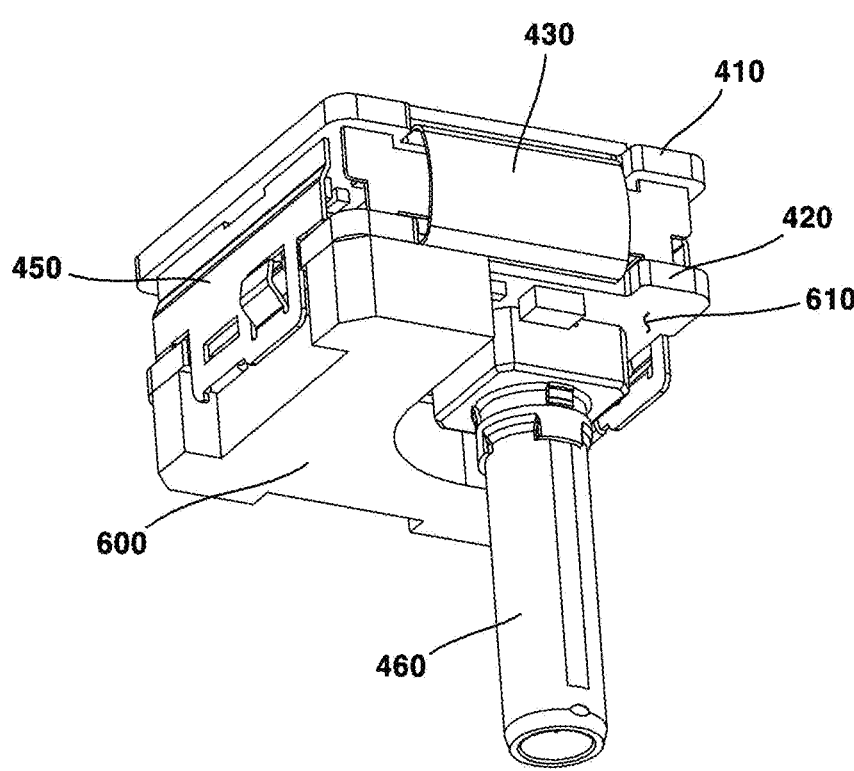

FIG. 1 is a perspective view of a camera module according to an embodiment of the present invention; FIG. 2 is an exploded perspective view of a camera module according to an embodiment of the present invention; FIG. 3 is a front view of a camera module according to an embodiment of the present invention; FIG. 4 is a cross-sectional view taken along line A-A of FIG. 3; FIG. 5 is a cross-sectional view taken along line B-B of FIG. 3; FIG. 6 is a perspective view of a camera module with a second body thereof removed according to an embodiment of the present invention; FIG. 7 is a side view of a camera module according to an embodiment of the present invention; FIG. 8 is a perspective view of a first body of a camera module according to an embodiment of the present invention; FIG. 9 is a perspective view of a second body of a camera module according to an embodiment of the present invention; FIG. 10 is a perspective view of a shield cover of a camera module according to an embodiment of the present invention; FIG. 11 is a perspective view of a substrate assembly of a camera module according to an embodiment of the present invention; FIG. 12 is a perspective view of the substrate assembly of FIG. 11 viewed from another angle; FIG. 13 is a perspective view of a spacer of a camera module according to an embodiment of the present invention; FIG. 14 is a perspective view illustrating a coupling relationship between a first body and a substrate assembly of a camera module according to an embodiment of the present invention; FIG. 15 is a rear view of a camera module according to an embodiment of the present invention; FIGS. 16 to 18 are views illustrating a manufacturing process of a shield cover of a camera module according to an embodiment of the present invention; FIG. 19 is a view illustrating a coupling surface between the shield cover and the second body of the camera module according to an embodiment of the present invention; and FIGS. 20 to 22 are views additionally illustrating a heat dissipation member of a camera module according to an embodiment of the present invention.

The camera module 10 according to an embodiment of the present invention may be a vehicle camera module. The camera module 10 may be coupled to a vehicle. The camera module 10 may be used in any one or more among a front camera, a side camera, a rear camera, and a black box of a vehicle. The camera module 10 may be disposed in front of a vehicle. The camera module 10 may be disposed at a rear of a vehicle. The camera module 10 may be coupled to a windshield of a vehicle. The camera module 10 may be coupled to a windshield at a front or rear of a vehicle. The camera module 10 may be disposed at a side of a vehicle. The camera module 10 may photograph a subject and output it as an image on a display (not shown).

The camera module 10 may include a first body 100. The first body 100 may be referred to as any one of a front body, an upper housing, and a first housing. The first body 100 may include a body part 110. The first body 100 may include a barrel unit 120. The first body 100 may include a lens 130. The body part 110, the barrel unit 120, and the lens 130 of the first body 100 may be integrally formed. Any two or more among the body part 110, the barrel unit 120, and the lens 130 of the first body 100 may be integrally formed. In a modified embodiment, the body part 110, the barrel unit 120, and the lens 130 may be formed separately.

The body part 110 may be coupled to the barrel unit 120. The first body part 110 may be integrally formed with the barrel unit 120. The body part 110 may be formed of a plastic material. The body part 110 may be disposed above a second body 200 to be described later. The body part 110 may be coupled to the second body 200. The lower end of the body part 110 may be fixed to the second body 200. The body part 110 may be coupled to the second body 200 by any one among ultrasonic welding, laser welding, and thermal welding. In a modified embodiment, the body part 110 may be coupled to the second body 200 by an adhesive. The body part 110 may be coupled to a first substrate 410 of a substrate assembly 400 to be described later.

The body part 110 may be formed in a rectangular shape with an open lower portion. At this time, the corner of the body part 110 may be formed to be rounded. The body part 110 may include an upper plate 111 and a side plate 112 being extended from the upper plate 111. The upper plate 111 may be formed in a rectangular shape. The upper plate 111 may be extended outwardly from an outer circumferential surface of the barrel unit 120. The side plate 112 may be extended downward from an outer edge of the upper plate 111. The side plate 112 may include a plurality of side plates 112. The side plate 112 may include four side plates. The side plate 112 may be formed in a rectangular plate shape. The side plate 112 may include a first side plate and a second side plate, a third side plate being disposed at an opposite side of the first side plate, and a fourth side plate being disposed at an opposite side of the second side plate. The side plate 112 may include first to fourth corners respectively being disposed between the first to fourth side plates. Each of the first to fourth corners may include a round shape at least in part.

The body part 110 may include a first protruded portion 113. The first protruded portion 113 may be protruded from a lower surface of the upper plate 111. The first protruded portion 113 may be disposed inside the second protruded portion 114 of a body part 110 to be described later. The first protruded portion 113 may be coupled to the first substrate 410. The first protruded portion 113 may be coupled to an outer edge of the first substrate 410. The first protruded portion 113 may be formed in a shape corresponding to the outer edge of the first substrate 410. A lower end of the first protruded portion 113 may be coupled to the first substrate 410. A lower end of the first protruded portion 113 may be fixed to the first substrate 410 by an adhesive.

The first protruded portion 113 may be protruded more than the second protruded portion 114. The length of the first protruded portion 113 in an optical axis direction may be longer than the length of the second protruded portion 114 in an optical axis direction. The maximum length of the first protruded portion 113 in an optical axis direction may be longer than the length of the second protruded portion 114 in an optical axis direction. The first protruded portion 113 may be spaced apart from the second protruded portion 114. The first protruded portion 113 may be spaced apart from the second protruded portion 114 in a direction perpendicular to the optical axis direction. At least a portion of the first protruded portion 113 may face the second protruded portion 114.

The first protruded portion 113 may be protruded more than the side plate 112. The length of the first protruded portion 113 in an optical axis direction may be longer than the length of the side plate 112 in an optical axis direction. The first protruded portion 113 includes: a first-first protruded portion facing the first side plate; a first-second protruded portion facing the second side plate; a first-third protruded portion facing the third side plate; and a first-fourth protruded portion facing the fourth side plate. The first-first to first-fourth protruded portions may be integrally formed. The first protruded portion 113 may be spaced apart from the side plate 112. The first protruded portion 113 may be spaced apart from the side plate 112 in a direction perpendicular to the optical axis direction.

The body part 110 may include a second protruded portion 114. The second protruded portion 114 may be protruded from a lower surface of the upper plate 111. The second protruded portion 114 may be disposed outside the first protruded portion 113. The second protruded portion 114 may be coupled to the second body 200. At least a portion of the second protruded portion 114 may be fusion-bonded to the second body 300. At least a portion of the second protruded portion 114 may be coupled to the second body 200 by any one among ultrasonic welding, laser welding, and thermal welding. In a modified embodiment, the second protruded portion 114 may be fixed to the second body 200 by an adhesive. Or, a portion of the second protruded portion 114 may be fusion-bonded with the second body 200, and the remaining portion may be coupled by an adhesive.

The second protruded portion 114 may not be protruded lower than the first protruded portion 113. The length of the second protruded portion 114 in an optical axis direction may be shorter than the length of the first protruded portion 113 in an optical axis direction. The maximum length of the second protruded portion 114 in an optical axis direction may be shorter than the length of the first protruded portion 113 in an optical axis direction. The second protruded portion 114 may face at least a portion of the first protruded portion 113. The second protruded portion 113 may include: a second-first protruded portion facing the first-first protruded portion; a second-second protruded portion facing the first-second protruded portion; a second-third protruded portion facing the first-third protruded portion; the second-fourth protruded portion facing the first-fourth protruded portion. The second-first to second-fourth protruded portions may be integrally formed. The second protruded portion 114 may include four corner protruded portions being disposed between the second-first to second-fourth protruded portions. The four corner protruded portions of the second protruded portion 114 may be formed at positions corresponding to the four corners of the body part 110. The second protruded portion 114 may be spaced apart from the first protruded portion 113. The second protruded portion 114 may be spaced apart from the first protruded portion 113 in a direction perpendicular to the optical axis direction.

The second protruded portion 114 may include a first side surface facing the first protruded portion 113, and a second side surface being disposed at an opposite side of the first side and being in contact with the second side plate 112. The length of the first side surface of the second protruded portion 114 in an optical axis direction may be shorter than the length of the second side surface of the second protruded portion 114 in an optical axis direction.

The second protruded portion 114 may include an inclined surface 114a. The inclined surface 114a may be inclined in a direction from the first side surface of the second protruded portion 114 toward the second side surface of the second protruded portion 114. The length of the second protruded portion 114 in an optical axis direction may increase as it travels from the first side surface of the second protruded portion 114 toward the second side surface of the second protruded portion 114. The inclined surface 114a may be fusion-bonded with the second body 200. At least a portion of the inclined surface 114a may be fusion-bonded with the second body 200.

The second protruded portion 114 may be in contact with the side plate 112. The second side surface of the second protruded portion 114 may be in contact with an inner surface of the side plate 112. The second protruded portion 114 may not be spaced apart from the side plate 112. The second protruded portion 114 may not be spaced apart from the side plate 112 in a direction perpendicular to the optical axis direction. The second protruded portion 114 may be extended along the inner surface of the side plate 112.

The second protruded portion 114 may not be protruded below the side plate 112. The length of the second protruded portion 114 in an optical axis direction may be shorter than the length of the side plate 112 in an optical axis direction. The maximum length of the second protruded portion 114 in an optical axis direction may be shorter than the length of the side plate 112 in an optical axis direction. At this time, the maximum length of the second protruded portion 114 in an optical axis direction may mean a length of the second side surface of the second protruded portion 114 in an optical axis direction.

The second protruded portion 114 may be disposed between the first protruded portion 113 and the side plate 112. The second protruded portion 114 may be disposed closer to the side plate 112 than the first protruded portion 113. The second protruded portion 114 may include: a second-first protruded portion being disposed on the first side plate; a second-second protruded portion being disposed on the second side plate; a second-third protruded portion being disposed on the third side plate; and a second-fourth protruded portion being disposed on the fourth side plate. The second protruded portion 114 may include a corner protruded portion being disposed between the second-first to second-fourth protruded portions. The corner protruded portions of the second protruded portion 114 may be disposed at positions corresponding to the first to fourth corners of the side plate 112.

The body part 110 may include a rib 115. The rib 115 may be protruded from a lower surface of the upper plate 111. The rib 115 may be disposed between the first protruded portion 113 and the second protruded portion 114. The rib 115 may connect the first protruded portion 113 and the second protruded portion 114. One end of the rib 115 may be coupled to the first protruded portion 113, and the other end of the rib 115 may be coupled to the second protruded portion 114. The rib 115 may be extended in a direction perpendicular to the extending direction of the first protruded portion 113. The extending direction of the rib 115 may be a direction perpendicular to the extending direction of the second protruded portion 114. At this time, the extending direction of the rib 115 may mean a long side direction of the rib 115. The extending direction of the rib 115 may be parallel to a direction perpendicular to the optical axis direction.

The rib 115 may include a plurality of ribs 115. The plurality of ribs 115 may be spaced apart from each other. A separation space may be formed between the plurality of ribs 115. Through this, heat generated when the second protruded portion 114 and the second body 200 are fusion-bonded can be prevented from being transmitted to the first protruded portion 113 and the first substrate 410 being coupled to the first protruded portion 113. The rib 115 may comprise: a first rib being disposed between the first-first protruded portion and the second-first protruded portion; a second rib being disposed between the first-second protruded portion and the second-first protruded portion; a third rib being disposed between the first-third protruded portion and the second-third protruded portion; and a fourth rib being disposed between the first-fourth protruded portion and the second-fourth protruded portion. Each of the first to fourth ribs may include a plurality of ribs. The first rib may include three ribs spaced apart from each other. The second rib may include three ribs spaced apart from each other. The third rib may include three ribs spaced apart from each other. The fourth rib may include three ribs spaced apart from each other. The rib 115 may reinforce the strength of the first protruded portion 113. The rib 115 may reinforce the strength of the second protruded portion 114. The rib 115 can minimize the phenomenon in which heat generated during the fusion process between the second protruded portion 114 and the second body 200 is transferred to the first protruded portion 113 and the first substrate 410 being coupled to the first protruded portion 113.

The first body 100 may include a barrel unit 120. The barrel unit 120 may be a lens barrel. The barrel unit 120 may be formed of a plastic material. The barrel unit 120 may be disposed in the body part 110. The barrel unit 120 may be extended from an upper surface of the body part 110. The barrel unit 120 may be integrally formed with the body part 110. In a modified embodiment, the barrel unit 120 may be coupled to the body part 110. In this case, the barrel unit 120 may be fixed to the body part 110 by an adhesive. The barrel unit 120 may accommodate the lens 130 therein. The barrel unit 120 may include a hole. A lens 130 may be disposed in the hole of the barrel unit 120. The inner circumferential surface of the hole of the barrel unit 120 may be formed in a shape and size corresponding to the outer circumferential shape of the lens 130.

The first body 100 may include a lens 130. The lens 130 may be disposed in the barrel unit 120. The lens 130 may be coupled to the barrel unit 120. The lens 130 may be disposed in a hole of the barrel unit 120. The lens 130 may include a plurality of lenses 130. The lens 130 may be aligned with an image sensor 440 to be described later. The optical axis may be aligned with the image sensor 440 of the lens 130. The optical axis of the lens 130 may coincide with the optical axis of the image sensor 440. The first body 100 may include an infrared ray filter (IR filter) being disposed between the lens 130 and the image sensor 440.

The camera module 10 may include a second body 200. The second body 200 may be referred to as any one among a rear body, a lower housing, and a second housing. The second body 200 may be formed in a rectangular shape with an open upper portion. The second body 200 may be formed of a plastic material. The second body 200 may be disposed below the first body 100. The second body 200 may be coupled to the first body 100. The second body 200 may be fusion-bonded to the first body 100. The second body 200 may be coupled to the first body 100 by any one among ultrasonic welding, laser welding, and thermal welding. At this time, ultrasonic welding may mean a process in which the first body 100 is vibrated with pressure while the second body 200 is fixed so that the fusion part of the second body 200 and the first body 100 is fused and integrated. The second body 200 may form an internal space through coupling with the first body 100.

The second body 200 may include a bottom plate 210. The bottom plate 210 may face the upper plate 111 of the body part 110 of the first body 110. The bottom plate 210 may be spaced apart from the upper plate 111 of the body part 110 of the first body 110 in an optical axis direction. The bottom plate 210 may be parallel to the upper plate 111 of the body part 110 of the first body 110. The bottom plate 210 may be formed in a rectangular shape. At this time, the corner of the bottom plate 210 may include a round shape at least in part.

The bottom plate 210 may include a first hole 211. The first hole 211 may be formed penetrating through the upper surface and the lower surface of the bottom plate 210. The first hole 211 may expose a shield cover 300, which will be described later, to the outside. Through this, heat generated in the inner space of the first body 100 and the second body 200 may be discharged to the outside. Through this, the heat dissipation function of the camera module 10 may be performed. The first hole 211 may be spaced apart from a third hole 212 to be described later.

The first hole 211 may include a plurality of first holes 211. The plurality of first holes 211 may have different shapes. The cross-sectional areas of the plurality of first holes 211 may be different from one another. The sizes of the plurality of first holes 211 may be different from one another. The plurality of first holes 211 may be disposed to avoid the holes 231 of the connector lead-out part 230. The plurality of first holes 211 may be formed to have different shapes and sizes to avoid the holes 231 of the connector lead-out part 230. Through this, the region in which the shield cover 300 is exposed to the outside through the bottom plate 210 of the second body 200 excluding the hole 231 of the connector lead-out part 230 can be maximized. At this time, the hole 231 of the connector lead-out part 230 may be disposed at an optimal position to minimize the size of the camera module 10, and in this case, the plurality of first holes 211 may be formed in a size and shape to maximize the exposure region of the shield cover 300 while avoiding the holes 231 of the connector lead-out part 230. The plurality of first holes 211 may include four first holes 211 being disposed and spaced apart from one another. The first hole 211 may include: a second-first hole 211-1; a second-second hole 211-2; a second-third hole 211-3; and a second-fourth hole 211-4. The second-first hole 211-1, the second-second hole 211-2, the second-third hole 211-3, and the second-fourth hole 211-4 may be formed in different shapes, respectively. The cross section of the second-first hole 211-1 may be formed in a curved shape at least in part. The cross-sectional area of the second-first hole 211-1 may be smaller than the cross-sectional area of the second-second to second-fourth holes 211-2, 211-3, and 211-4. The cross section of the second-second hole 211-2 may be formed in a curved shape at least in part. The cross-sectional area of the second-second hole 211-2 may be larger than that of the second-first hole 211-1. The cross-sectional area of the second-second hole 211-2 may be smaller than the cross-sectional area of the second-third hole 211-3 and the cross-sectional area of the second-fourth hole 211-4. The cross-section of the second-third hole 211-3 may be curved at least in part. The cross-sectional area of the second-third hole 211-3 may be formed to be larger than the cross-sectional area of the second-first hole 211-1, the cross-sectional area of the second-second hole 211-2, and the cross-sectional area of the second-fourth hole 211-4. The cross section of the second-fourth hole 211-4 may be formed in a curved shape at least in part. The cross-sectional area of the second-fourth hole 211-4 may be larger than that of the second-first hole 211-1 and the cross-sectional area of the second-second hole 211-2. The cross-sectional area of the second-fourth hole 211-4 may be smaller than that of the second-third hole 211-3. The second-first hole 211-1 and the second-third hole 211-3 may be disposed opposite to each other about the third hole 212. The second-second hole 211-2 and the second-fourth hole 211-4 may be disposed at an opposite side from each other about the third hole 212.

The bottom plate 210 may include a third hole 212. The third hole 212 may be spaced apart from the first hole 211. The third hole 212 may be formed in a circular shape. A connector lead-out part 230 to be described later may be disposed in the third hole 212. The connector lead-out part 230 may penetrate through the third hole 212. A connector 460 to be described later may pass through the second hole 212. A bottom plate 310 of a shield cover 300 to be described later may be disposed in the bottom plate 210. The bottom plate 210 may be in surface contact with the bottom plate 310 of the shield cover 300. The bottom plate 310 of the shield cover 300 may be coupled to the bottom plate 210 by insert injection.

The second body 200 may include a side plate 220. The side plate 220 may be extended from the bottom plate 210. The side plate 220 may be extended from an outer edge of the bottom plate 210. A shield cover 300 may be disposed in the side plate 220. The shield cover 300 may be in surface contact with the inner surface of the side plate 220. The side plate 320 of the shield cover 300 may be coupled to the side plate 220 by insert injection. An upper end of the side plate 220 may be coupled to the first body 100. The outer side surface of the side plate 200 may be disposed on the same plane as the outer side surface of the side plate 112 of the first body 100.

The side plate 220 may include a first region 224 in which the second hole 223 is formed, and a second region 225 being extended from the first region 224 and not being formed with the second hole 223. The first region 224 of the side plate 220 may be attached to the shield cover 300. The second region 225 of the side plate 220 may not be attached to the shield cover 300 and the first body 100. The inner side surface of the side plate 220 may include a step structure formed by the first region 224 and the second region 225. The inner side surface of the first region 224 of the side plate 220 may be disposed outside the inner side surface of the second region 225 of the side plate 220. The inner side surface of the second region 225 of the side plate 220 may be protruded more inward than the inner side surface of the first region 224 of the side plate 220. The thickness t2 of the second region 225 of the second body 200 may be greater than the thickness t1 of the first region 224 of the second body 200. The width d1 between the inner side surfaces of the first region 224 of the second body 200 facing each other may be larger than the width d2 between the inner side surfaces of the second region 225 of the second body 200 facing each other.

The side plate 320 of the shield cover 300 may be disposed in the first region of the side plate 200. The side plate 320 of the shield cover 300 may be attached to the first region of the side plate 200. The side plate 320 of the shield cover 300 may be directly in contact with and attached to the first region of the side plate 200. The coating layer C of the shield cover 300 may be attached to a first region of the side plate 200. The thickness t3 of the side plate 320 of the shield cover 300 in a direction perpendicular to the optical axis direction may be thinner than the thickness t2 of the second region of the side plate 220 in a corresponding direction. The side plate 220 may include: a first side plate 220a; a second side plate 220b; a third side plate 220c being disposed at an opposite side of the first side plate 220a; and a fourth side plate 220d being disposed at an opposite side of the second side plate 220b. The side plate 220 may include: a first corner 220e being disposed between the first side plate 220a and the second side plate 220b; a second corner 220f being disposed between the second side plate 220b and the third side plate 220c; a third corner 220g being disposed between the third side plate 220c and the fourth side plate 220d; and a fourth corner 220h being disposed between the fourth side plate 220d and the first side plate 220a. The first to fourth corners 220e, 220f, 220g, and 220h of the side plate 220 may include a round shape.

The side plate 220 may include a third protruded portion 221. The third protruded portion 221 may be protruded upward from the upper end of the side plate 220. The third protruded portion 221 may be protruded upward from the upper surface 222 of the side plate 220. The third protruded portion 221 may abut against the second protruded portion 114 of the first body 100. The third protruded portion 221 may be disposed on the inclined surface 114a of the second protruded portion 114 of the first body 100. The third protruded portion 221 may be coupled to at least a portion of the second protruded portion 114 of the first body 100. The third protruded portion 221 may be fusion-bonded with at least a portion of the second protruded portion 114 of the first body 100. At this time, fusion bonding may mean any one among ultrasonic welding, laser welding, and thermal welding. The third protruded portion 221 may be protruded from a part of the region of the upper surface 222 of the side plate 220. An outer surface of the third protruded portion 221 may be in contact with an inner side surface of the side plate 112 of the first body 100. A portion of the third protruded portion 221 is in contact with the inclined surface 114a of the second protruded portion 114 of the first body 100 by fusion, and the remaining portion of the third protruded portion 221 may be in contact with the side plate 112 of the first body 100.

The side plate 220 may include an upper surface 222. The upper surface 222 may mean a surface facing the body part 110 of the first body 100. The upper surface 222 may include: a first region from which the third protruded portion 221 is protruded; and a second region form which the third protruded portion 221 is not protruded. The second region may be disposed outside the first region. The lower end of the side plate 112 of the first body 100 may be disposed in the second region of the upper surface 222. The second region of the upper surface 222 may be coupled with a lower end of the side plate 112 of the first body 100. The second region and the third protruded portion 221 of the upper surface 222 may form a step structure. The second region and the third protruded portion 221 of the upper surface 222 may be disposed to form a step.

The side plate 220 may include a second hole 223. A second hole 223 may be formed in the side plate 220. The second hole 223 may be formed by penetrating through the outer surface and the inner side surface of the side plate 220. The shield cover 300 may be exposed to the outside through the second hole 223. The second hole 223 may expose at least a portion of the side plate 320 of the shield cover 300 to the outside.

The second hole 223 may include a plurality of second holes 223. The second hole 223 may include: a second-first hole being formed in the first side plate 220a; a second-second hole being formed in the second side plate 220b; a second-third hole being formed in the third side plate 220c; and a second-fourth hole being formed in the fourth side plate 220d. The second-first hole may be formed between the first corner 220e and the fourth corner 220h. The second-first hole may be spaced apart from the first corner 220e and the fourth corner 220h. The second-first hole may include a plurality of second-first holes spaced apart from each other. The second-first hole may include five second-first holes spaced apart from one another. The second-second hole may be disposed between the first corner 220e and the second corner 220f. The second-second hole may be spaced apart from the first corner 220e and the second corner 220f. The second-second hole may include a plurality of second-second holes spaced apart from one another. The second-second hole may include five second-second holes spaced apart from one another. The second-third hole may be disposed between the second corner 220f and the third corner 220g. The second-third hole may be spaced apart from the second corner 220f and the third corner 220g. The second-third hole may include a plurality of second-third holes spaced apart from one another. The second-third hole may include five second-third holes spaced apart from one another. The second-fourth hole may be disposed between the third corner 220g and the fourth corner 220h. The second-fourth hole may be spaced apart from the third corner 220g and the fourth corner 220h. The second-fourth hole may include a plurality of second-fourth holes spaced apart from one another. The second-fourth hole may include five second-fourth holes spaced apart from one another. The plurality of second holes 223 may be formed to have the same shape as each other. However, the present invention is not limited thereto and may be formed and disposed in various shapes to maximize external exposure of the shield cover 300. The second hole 223 may be formed in a shape different from that of the first hole 211. The cross-sectional area of the second hole 223 may be different from the cross-sectional area of the first hole 211.

The second hole 223 may be disposed in the first to fourth side plates 220a, 220b, 220c, and 220d of the second body 200, respectively. The second hole 223 may include five second-first holes being disposed in the first side plate 220a. The length of the first side plate 220a in a direction perpendicular to the optical axis direction may be 1.5 to 2.5 times the total length of the five second-first holes in the corresponding direction. For example, it may be 2 times. The length of the first side plate 220a in an optical axis direction may be twice the length of the second-first hole in the corresponding direction. The cross-sectional area of the first side plate 220a may be 3 to 5 times the total cross-sectional area of the five second-first holes. For example, it may be 4 times. At this time, the cross-sectional area may mean a cross-sectional area calculated by assuming a square plate in which the second-first hole of the first side plate 220a is not formed. That is, the cross-sectional area of the first side plate 220a may be calculated excluding the second-first hole. However, the present invention is not limited thereto, and the second hole 223 may be formed in various sizes and numbers in order to maximize the exposure region of the shield cover 300.

The second body 200 may include a connector lead-out part 230. The connector lead-out part 230 may be coupled to the bottom plate 210. The connector lead-out part 230 may be disposed in the third hole 212 of the bottom plate 210. The connector lead-out part 230 may penetrate through the third hole 212 of the bottom plate 210. The connector lead-out part 230 may have a connector 460 disposed therein. The connector lead-out part 230 may be formed of a plastic material. The connector lead-out part 230 may include a first portion being protruded above the bottom plate 210. The connector lead-out part 230 may include a second portion that also being protruded below the bottom plate 210. The first portion and the second portion of the connector lead-out part 230 may be integrally formed. The length of the first portion of the connector lead-out part 230 in an optical axis direction may be smaller than the length of the second portion of the connector lead-out part 230 in an optical axis direction. The length of the first portion in the optical axis direction may correspond to the thickness of the bottom plate 310 of the shield cover 300. The upper surface of the first portion may be disposed on the same plane as the upper surface of the bottom plate 310 of the shield cover 300. The connector lead-out part 230 may include a hole 231. A connector 460 may be disposed in the hole 231. The hole 231 may accommodate at least a portion of the connector 460. Through this, the connector lead-out part 230 may fix the connector 460.

The camera module 10 may include a shield cover 300. The shield cover 300 may be formed of a metal material. The shield cover 300 may include a bottom plate 310, a side plate 320 being extended from the bottom plate 310, and corners 330 being disposed in the plurality of side plates 320. The bottom plate 310, the side plate 320, and the corner 330 may be integrally formed. The bottom plate 310 may be in contact with the bottom plate 210 of the second body 200.

The bottom plate 310 may include a hole 311. The hole 311 may be formed in a shape corresponding to the third hole 212 of the second body 200. The hole 311 may be formed to have a size corresponding to that of the third hole 212 of the second body 200. At least a portion of the connector lead-out part 230 may be disposed in the hole 311. The connector lead-out part 230 may penetrate through the hole 311. The inner circumferential surface of the hole 311 may be in contact with at least a portion of the outer circumferential surface of the connector lead-out part 230.

At least a portion of the connector 460 may be disposed in the hole 311. A connector 460 may penetrate through the hole 311.

The side plate 320 may include: a first side plate 321; a second side plate 322; a third side plate 323 being disposed at an opposite side of the first side plate 321; and a fourth side plate 324 being disposed at an opposite side of the second side plate 322. The outer side surface of the first side plate 321 may be in contact with an inner side surface of the first side plate 220*a* of the second body 200. The outer side surface of the second side plate 322 may be in contact with an inner side surface of the second side plate 220*b* of the second body 200. The outer side surface of the third side plate 323 may be in contact with an inner side surface of the third side plate 220*c* of the second body 200. The outer side surface of the fourth side plate 324 may be in contact with an inner side surface of the fourth side plate 220*d* of the second body 200.

The side plate 320 may include: a first corner 331 being disposed on the first side plate 321 and the second side plate 322; a second corner 332 being disposed between the second side plate 322 and the third side plate 323; a third corner 333 being disposed between the third side plate 323 and the fourth side plate 324; a fourth corner 334 being disposed between the fourth side plate 324 and the first side plate 321. The outer circumferential surface of the first corner 331 may be in contact with the inner circumferential surface of the first corner 220*e* of the second body 200. The outer circumferential surface of the second corner 332 may be in contact with an inner circumferential surface of the second corner 220*f* of the second body 200. The outer circumferential surface of the third corner 333 may be in contact with an inner circumferential surface of the third corner 220*g* of the second body 200. The fourth corner 334 may be in contact with an inner circumferential surface of the fourth corner 220*h* of the second body 200. The shield cover 300 may be grounded with the second substrate 420. Shield cover 300 and the outer surface of the connector 460 may be grounded.

The shield cover 300 may be coupled to the second body 200 to be waterproof. Depending on the use, waterproofing may satisfy IP52 or higher for waterproof and dustproof, and when it is installed outside of a vehicle, it may satisfy IP69K.

Referring to FIGS. 16 to 18, the shield cover 300 may be integrally formed by forming a metal. That is, the bottom plate 310, the side plate 320, and the corner 330 of the shield cover 300 may be integrally formed by molding metal. In more detail, the shield cover 300 may be seated on a solid mold 500 having a rectangular shape. At this time, the shape of the shield cover 300 may be made by pressing the shield cover 300 in a direction toward the mold 500. In this case, it is possible to solve the problem of forming a gap between the side plate and the side plate, which is generated in the shield cover being formed by bending the plate material to form the side plate and coupling the formed side plate to the side plate. That is, since the shield cover 300 of the present invention is integrally formed with the side plate 320 and the corner 330, between the plurality of side plates 320 or between the side plates 320 and the corner 330 may not be spaced apart.

The shield cover 300 may be treated with a metal surface. The shield cover 300 may be pre-treated. A bonding surface of the shield cover 300 with the second body 200 may be treated with a metal surface. The bonding surface of the shield cover 300 with the second body 200 may be pre-treated. The shield cover 300 may undergo a pretreatment process of the metal surface before insert injection into the second body 200. The shield cover 300 may be formed of aluminum. At least a portion of the shield cover 300 may be formed of aluminum. The shield cover 300 may be formed of a metal material having high thermal conductivity. The pretreatment or metal surface treatment may refer to a process of removing oil attached to the metal surface and forming a coating layer or a surface treatment layer. At this time, the surface treatment layer may mean a higher concept including a coating layer C or a film layer. The surface treatment layer may include a coating layer C. The surface treatment layer may include a film layer. When the bonding surface of the shield cover 300 with the second body 200 is immersed in a special solution for a certain time, nano-sized pores S on the bonding surface of the shield cover 300 with the second body 200 can be formed. Through this, a portion of the second body 200 made of plastic is melted by the heat generated during the insert injection process of the shield cover 300 and the second body 200 and may flow into the pores S of the shield cover 300. In this case, the bonding force, the coupling force, and the adhesion force between the shield cover 300 and the second body 200 may be increased. In addition, if the bonding surface of the shield cover 300 with the second body 200 is immersed in a special solution for a certain period of time, the coating layer C or the film layer on the bonding surface of the shield cover 300 with the second body 200 can be formed. Through this, it is possible to prevent the interfacial separation phenomenon between the bonding surface of the shield cover 300 and the second body 200. In addition, it may be possible to waterproof between the shield cover 300 and the second body 200 without a separate waterproof member or sealing member.

The shield cover 300 may be fixed to the second body 200 through insert molding. The shield cover 300 may be fixed to the second body 200 through insert molding. Insert injection or insert molding may refer to a molding method in which a metal member and a plastic member are integrated. A portion of the second body 200 may be melted by the heat generated during the insert injection process and introduced into the pores S generated during the pretreatment of the shield cover 300.

The camera module 10 may include a substrate assembly 400. The substrate assembly 400 may be disposed inside the second body 200. The substrate assembly 400 may be disposed in an internal space formed by the coupling of the first body 100 and the second body 300. The substrate assembly 400 may be disposed inside the shield cover 300.

The substrate assembly 400 may include a first substrate 410. The first substrate 410 may include a printed circuit board. The first substrate 410 may include a rigid printed circuit board. An image sensor 440 may be disposed on the first substrate 410. At this time, the first substrate 410 may be called a sensor substrate. The first substrate 410 may include a first surface facing the body part 100 of the first body 100 and a second surface being disposed at an opposite side of the first surface. The image sensor 440 may be disposed in the first surface of the first substrate 410. The first substrate 410 may be coupled to the first body 100. The first substrate 410 may be coupled to the first protruded portion 113 of the first body 100. The outer edge of the first surface of the first substrate 410 may be coupled to the first protruded portion 113 of the first body 100.

The substrate assembly 400 may include a second substrate 420. The second substrate 420 may include a printed circuit board. The second substrate 420 may include a rigid printed circuit board. The second substrate 420 may be disposed below the first substrate 410. The second substrate 420 may be spaced apart from the first substrate 410. The second substrate 420 may be spaced apart from the first substrate 410 in an optical axis direction. The second substrate 420 may supply power to the first substrate 410. The second substrate 420 may be disposed parallel to the first substrate 410. The second substrate 420 may be electrically connected to the connector 460. The second substrate 420 may include a first surface facing the first substrate 410 and a second surface being disposed at an opposite side of the second surface. A connector 460 may be disposed on the second surface of the second substrate 420.

The substrate assembly 400 may include a third substrate 430. The third substrate 430 may include a flexible printed circuit board (FPCB). The third substrate 430 may electrically connect the first substrate 410 and the second substrate 420. One end of the third substrate 430 may be connected to the first substrate 410, and the other end of the third substrate 430 may be connected to the second substrate 420. The third substrate 430 may have elasticity.

The substrate assembly 400 may include a spacer 450. The spacer 450 may be referred to as a shield can. The spacer 450 may be referred to as an electromagnetic wave shielding member. The spacer 450 may block electromagnetic interference (EMI) or electromagnetic waves. The spacer 450 may serve to separate between the plurality of substrates. The spacer 450 may be formed of a metal material.

The spacer 450 may be referred to as a first shield can, and in this case, the shield cover 300 may be referred to as a second shield can. The spacer 450 may be disposed below the first substrate 410. The spacer 450 may be disposed above the second substrate 420. The spacer 450 may be disposed between the first substrate 410 and the second substrate 420. The spacer 450 may separate the first substrate 410 and the second substrate 420 from each other.

The spacer 450 may include a body part 451. The body part 451 may include a plurality of body parts 451. The body part 451 may include: a first body portion 451a; a second body portion 451b; a third body portion 451c being disposed at an opposite side of the first body portion 451a; and a fourth body portion 451d being disposed at an opposite side of the second body portion 451b. The first to fourth body portions 451a, 451b, 451c, and 451d may be spaced apart from one another except for a connection part 456 to be described later.

The body part 451 may include a first protrusion 452 being formed at an upper end of the body part 451. The first protrusion 452 may include two protrusions 452 spaced apart from each other. The first protrusion 452 may be disposed in the second surface of the first substrate 410. The body part 451 may include a groove 453 being formed between the first protrusions 452. The width of the groove 453 being formed between the two first protrusions 452 of the first body portion 451a may be formed to be larger than the width of the groove 453 being formed between the two first protrusions 452 of the second to fourth body portions 451b, 451c, and 451d. Through this, the third substrate 430 may pass through the groove 453 being formed in the first body portion 451a to electrically connect the first substrate 410 and the second substrate 420.

The spacer 450 may include a first coupling part 454. The first coupling part 454 may be formed at a lower end of each of the second body portion 451b and the fourth body portion 451d. The first coupling part 454 may be protruded downward from at least a partial region of the lower ends of the second body portion 451b and the fourth body portion 451d.

The first coupling part 454 may include a first hole 454a. The first hole 454a of the first coupling part 454 being formed in the second body portion 451b may be overlapped with the first hole 454a of the first coupling part 454 being formed in the fourth body portion 451d in a direction perpendicular to the optical axis direction. At least a portion of a second protrusion 454c to be described later may be disposed in the first hole 454a. The first hole 454a may be formed to prevent interference with the second protrusion 454c.

The first coupling part 454 may include a second hole 454b. The second hole 454b of the first coupling part 454 being formed in the second body portion 451b may be overlapped with the second hole 454b of the first coupling part 454 being formed in the fourth body portion 451d in a direction perpendicular to the optical axis direction. The second hole 454b may be formed to create a third protrusion 454d, which will be described later. The second hole 454b may be spaced apart from the first hole 454a.

The first coupling part 454 may include a second protrusion 454c. The second protrusion 454c of the first coupling part 454 being formed in the second body portion 451b may be overlapped with the second protrusion 454c of the first coupling part 454 being formed in the fourth body portion 451d in a direction perpendicular to the optical axis direction. The second protrusion 454c may be formed by being bent from a portion of the lower end of the first coupling part 454. The second protrusion 454c may include a bent portion for supporting the second surface of the second substrate 420. An end of the bent portion of the second protrusion 454c may be disposed in the first hole 454a. The second substrate 420 may be fixed to the spacer 450 through the second protrusion 454c.

The first coupling part 454 may include a third protrusion 454d. The third protrusion 454d may be formed by cutting a partial region of the first coupling part 454 and pressing the cut region outward. At this time, the cut region may be the second hole 454b. The third protrusion 454d of the first coupling part 454 being formed in the second body portion 451b may be overlapped with the third protrusion 454d of the first coupling part 454 being formed in the fourth body portion 451d in a direction perpendicular to the optical axis direction. The third protrusion 454d may include a first region being extended inclinedly against the first coupling part 454 and a second region being extended parallel to the first coupling part 454 from the first region.

The spacer 450 may include a second coupling part 455. The second coupling part 455 may be extended downward from a lower end of the third body portion 451c. The second coupling part 455 may be extended downwardly from a partial region of the lower end of the third body portion 451c. The second coupling part 455 may include a third hole 455a. A portion of the second substrate 420 may be disposed in the third hole 455a. A portion of the second substrate 420 may be fit-coupled into the third hole 455a to fix the second substrate 420.

The spacer 450 may include a connection part 456. The connection part 456 may connect the first to fourth body portions 451a, 451b, 451c, and 451d. The connection part 456 may include a curved surface. The connection part 456 may be disposed on a first surface of the second substrate 420. The connection part 456 may press the second substrate 420 downward, and the second protrusion 454c may press the second substrate 420 upward to fix the second substrate 420.

The spacer 450 may be disposed in the shield cover 300. The shield member 450 may be spaced apart from the shield cover 300. The shield member 450 may be spaced apart from the bottom plate 310 of the shield cover 300 in an optical axis direction. The shield member 450 may be spaced apart from the side plate 320 of the shield cover 300 in a direction perpendicular to the optical axis direction. The spacer 450 may be formed of a metal material. The thickness of the spacer 450 may be thinner than the thickness of the side plate 320 of the shield cover 300. The spacer 450 may face the side plate 320 of the shield cover 300.

The substrate assembly 400 may include a connector 460. The connector 460 may be disposed on the second surface of the second substrate 420. The connector 460 may be fixed to the second surface of the second substrate 420. The connector 460 may be electrically connected to the second substrate 420. A portion of the connector 460 may be disposed inside the shield cover 300, and the remaining portion may be disposed in the connector lead-out part 230 of the second body 200. The connector 460 may penetrate through the hole 311 of the shield cover 300. The connector 460 may penetrate through the third hole 212 of the second body 200.

Referring to FIGS. 20 to 22, the camera module 10 may include a heat dissipation member 600. The heat dissipation member 600 may be named as any one of a heat dissipation pad, a heating pad, and a thermal pad. The heat dissipation member 600 may be formed of a thermally conductive material.

The heat dissipation member 600 may be disposed inside the shield cover 300. The heat dissipation member 600 may be disposed in the bottom plate 310 of the shield cover 300. The heat dissipation member 600 may be disposed between the bottom plate 310 of the shield cover 300 and the second substrate 420. One end of the heat dissipation member 600 may be in contact with the second surface of the substrate 420, and the other end of the heat dissipation member 600 may be in contact with the bottom plate 310 of the shield cover 300. Through this, heat generated from the substrate assembly 400 can be transferred to the shield cover 300 to maximize heat dissipation performance.

The heat dissipation member 600 may include: a first side facing the first side 220a of the second body 200; a second side facing the second side 220b of the second body 200; a third side facing the third side 220c of the second body 200; and a fourth side facing the fourth side 220d of the second body 200.

The heat dissipation member 600 may include a groove portion 610. The groove portion 610 may be formed by being recessed from the second side surface of the heat dissipation member 600. The groove portion 610 may be formed by being recessed from the third side surface of the heat dissipation member 600. The groove portion 600 may be formed to avoid the hole 311 of the bottom plate 310 of the shield cover 300. The groove portion 600 may be formed to avoid the connector 460 of the substrate assembly 400. The groove portion 610 may include a curved surface at least in part. The groove portion 610 may be formed to be round.

Hereinafter, the camera module 20 according to another embodiment of the present invention will be described in more detail with reference to the accompanying drawings.

Figure 23:
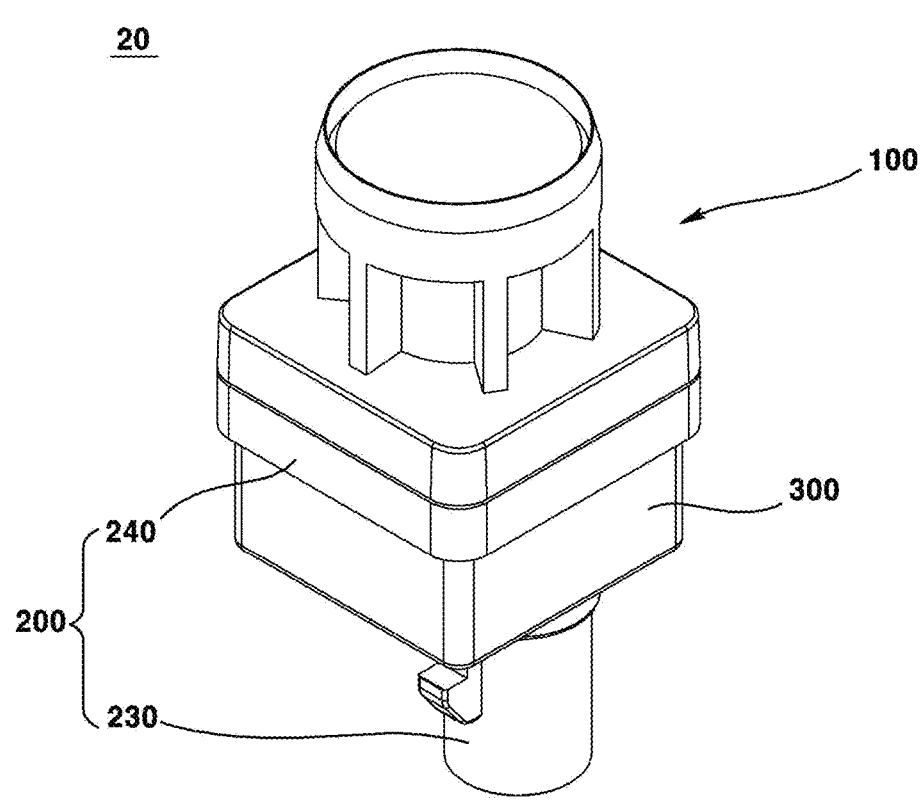
FIG. 23 is a perspective view of a camera module according to another embodiment of the present invention.
Figure 24:
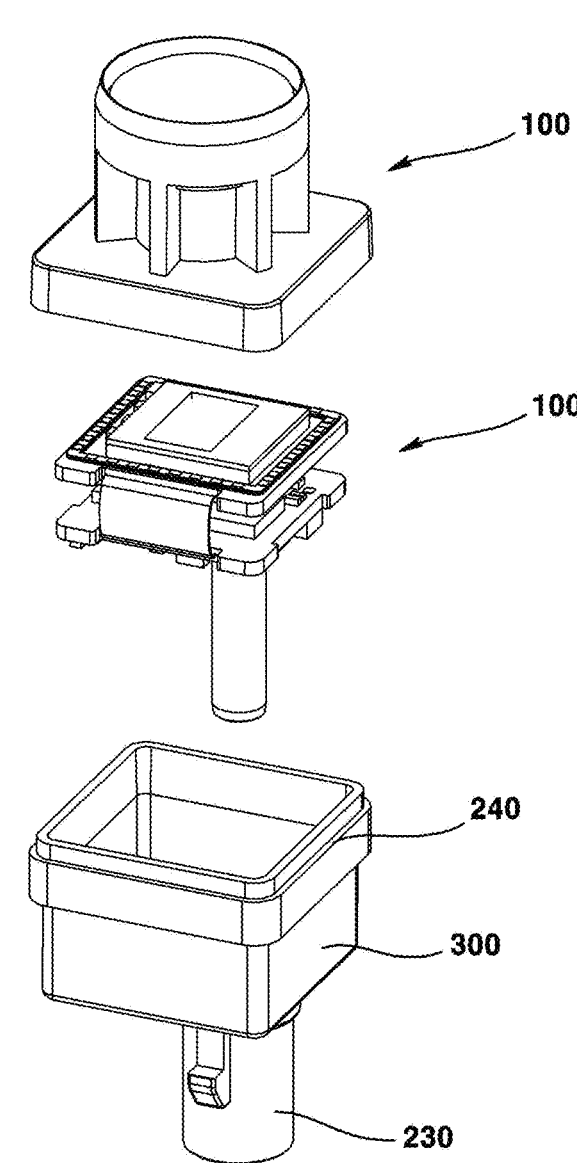
FIGS. 24 and 25 are exploded perspective views of a camera module according to another embodiment of the present invention.
Figure 25:
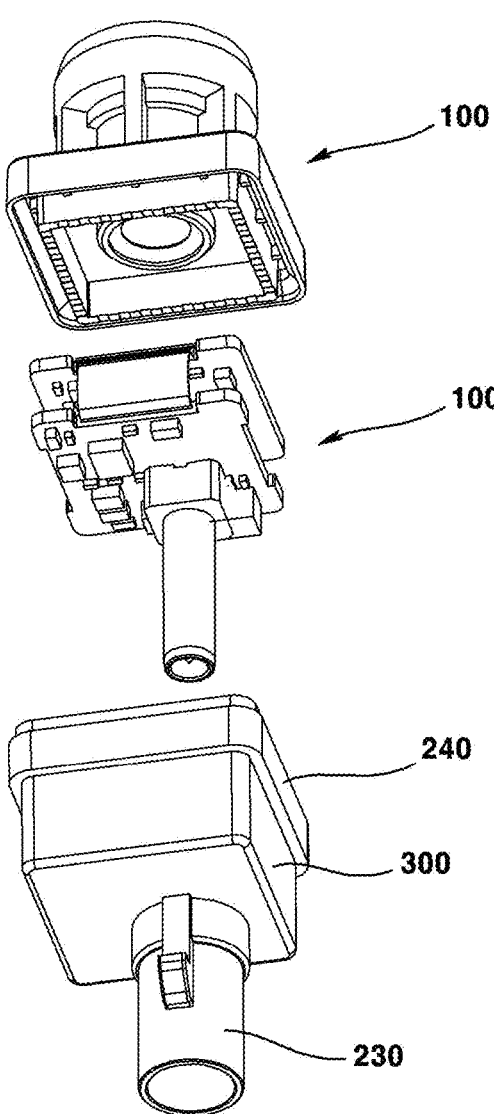
Figure 26:
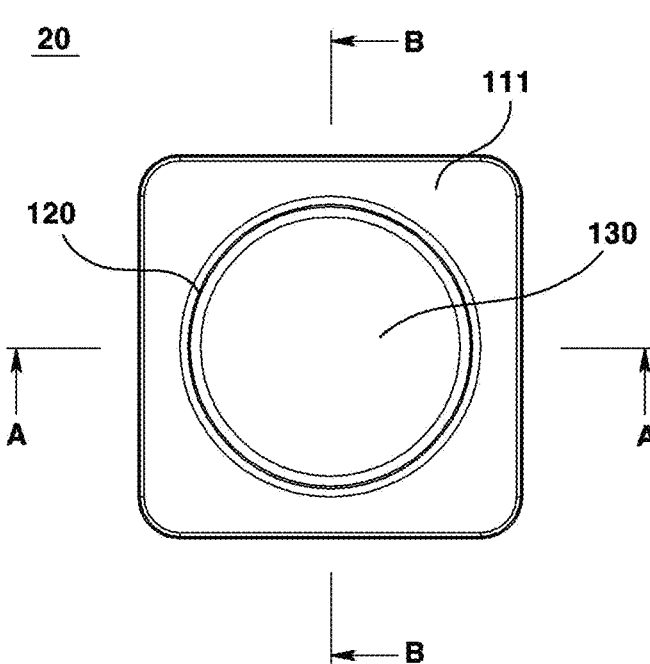
FIG. 26 is a front view of a camera module according to another embodiment of the present invention.
Figure 27:
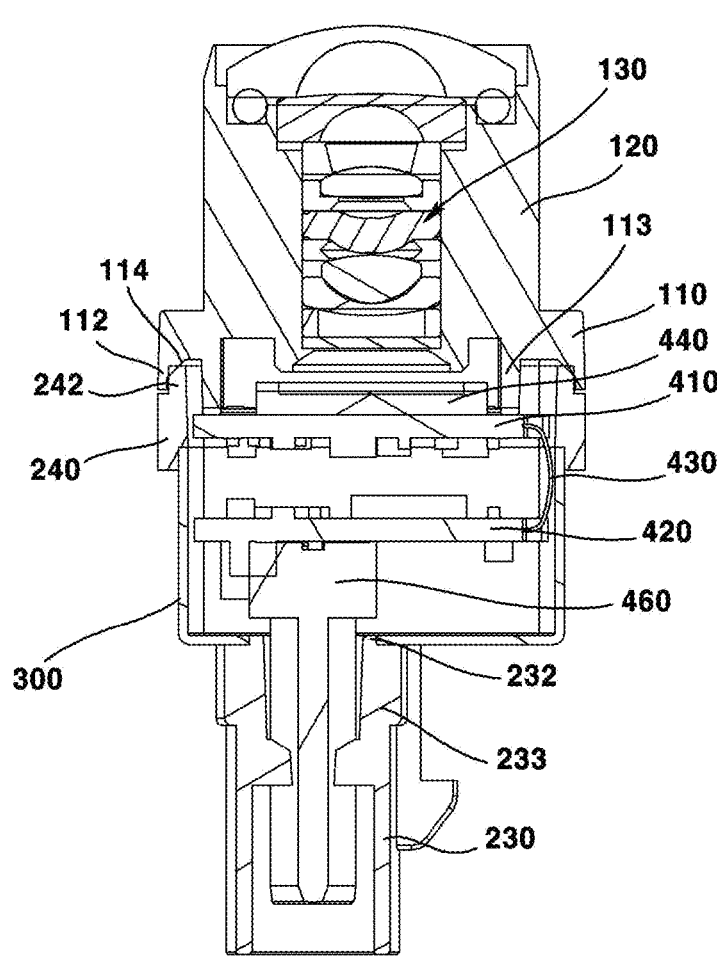
FIG. 27 is a cross-sectional view taken along line A-A of FIG. 26.
Figure 28:
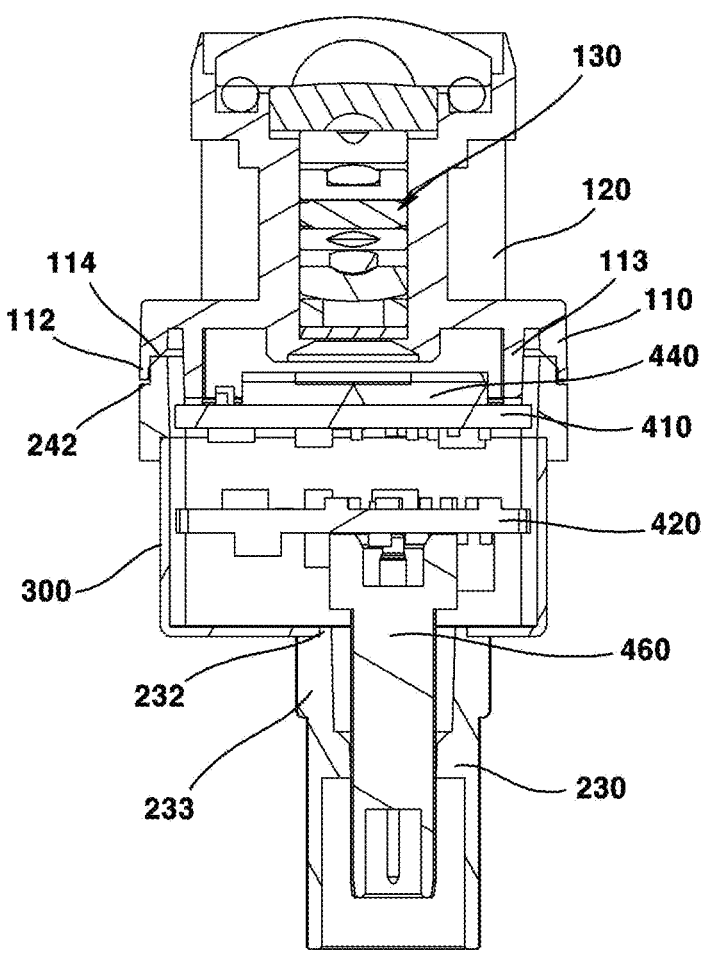
FIG. 28 is a cross-sectional view taken along line B-B of FIG. 26.
Figure 29:
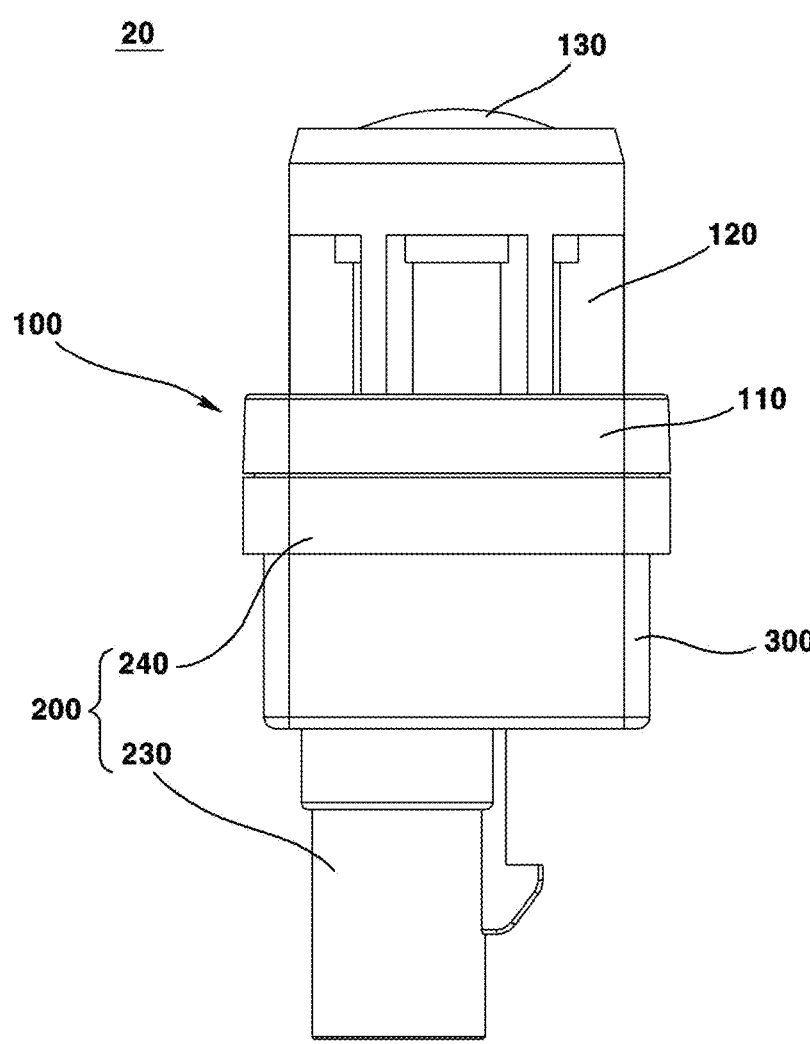
FIG. 29 is a side view of a camera module according to another embodiment of the present invention.
Figure 30:
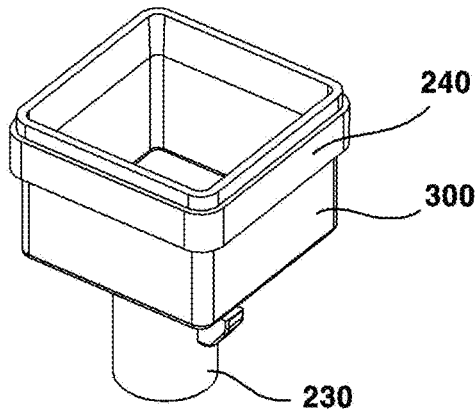
FIG. 30 is a perspective view of a partial configuration of a camera module according to another embodiment of the present invention.
Figure 31:
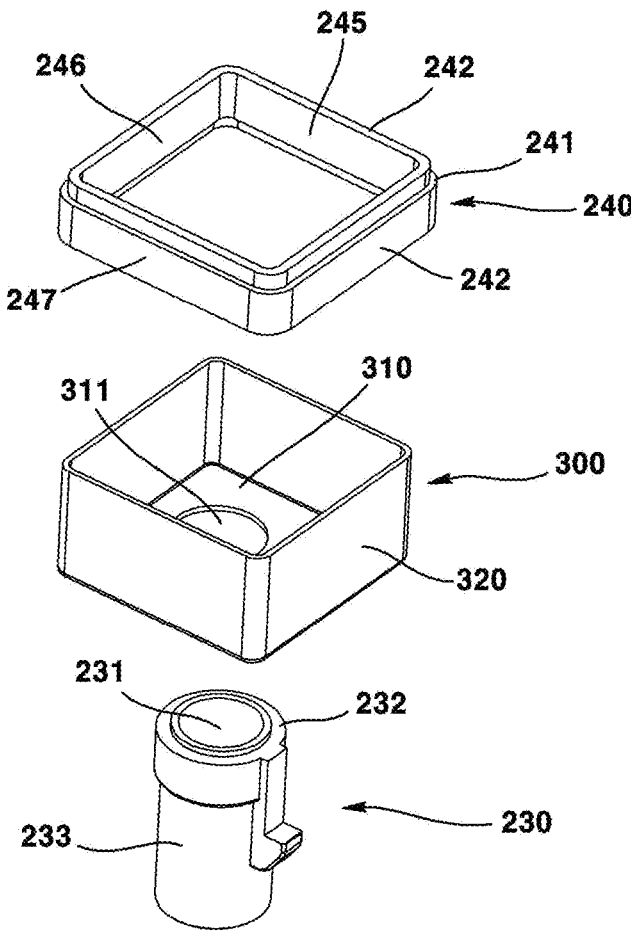
FIG. 31 is an exploded perspective view of FIG. 30.
Figure 32:
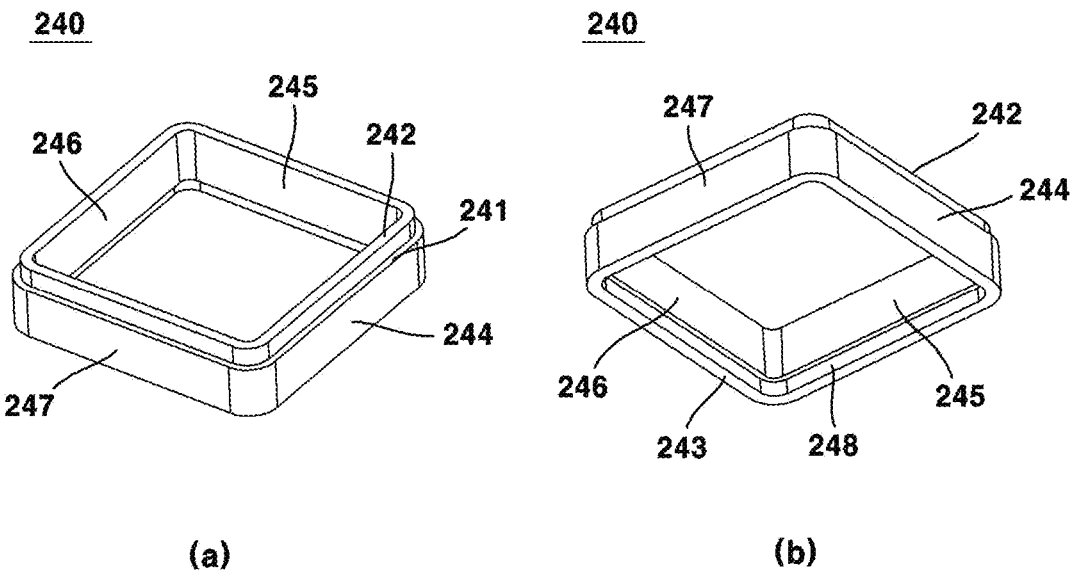
FIGS. 32(a) and (b) are perspective views viewed from different angles of the second body part of the camera module according to another embodiment of the present invention.

FIG. 23 is a perspective view of a camera module according to another embodiment of the present invention; FIGS. 24 and 25 are exploded perspective views of a camera module according to another embodiment of the present invention; FIG. 26 is a front view of a camera module according to another embodiment of the present invention; FIG. 27 is a cross-sectional view taken along line A-A of FIG. 26; FIG. 28 is a cross-sectional view taken along line B-B of FIG. 26; FIG. 29 is a side view of a camera module according to another embodiment of the present invention; FIG. 30 is a perspective view of a partial configuration of a camera module according to another embodiment of the present invention; FIG. 31 is an exploded perspective view of FIG. 30; and FIGS. 32(a) and (b) are perspective views viewed from different angles of the second body part of the camera module according to another embodiment of the present invention.

The camera module 20 according to another embodiment of the present invention may be interpreted as having the same configuration except for the second body 200 of the camera module 10 according to an embodiment of the present invention. The same reference numerals may be assigned to the same configurations as those of the camera module 10 according to an embodiment among the camera modules 20 according to another embodiment.

The camera module 20 may include a second body 200. The second body 200 may be referred to as any one among a rear body, a lower housing, and a second housing. The second body 200 may be formed in a rectangular shape with an open upper portion. The second body 200 may be formed of a plastic material. The second body 200 may be disposed below the first body 100. The second body 200 may be disposed above the shield cover 300. The second body 200 may be coupled to the first body 100. The second body 200 may be coupled to the shield cover 300. The second body 200 may be fusion-bonded to the first body 100. The second body 200 may be coupled to the first body 100 by any one among ultrasonic welding, laser welding, and thermal welding. At this time, ultrasonic welding may mean a process in which the fusion part of the second body 200 and the first body 100 is fused and integrated by vibrating the first body 100 with pressure while the second body 200 is fixed.

The second body 200 may include a second body part 240. The second body part 240 may be coupled to the first body part 110 of the first body 100. An upper portion of the second body part 240 may be coupled to the first body part 110. The second body part 240 may be fusion-bonded with the first body part 110. The second body part 240 may be coupled to the first body part 110 by any one among ultrasonic welding, laser welding, and thermal welding. The second body part 200 may be formed of a plastic material.

The second body part 240 may include an upper surface 241. The upper surface 241 may be a surface facing the first body part 110. The upper surface 241 may include a first region in which the protruded portion 242, which will be described later, is protruded, and a second region in which the protruded portion 242 is not protruded. The side plate 112 of the first body part 110 may be disposed in a second region of the upper surface 241. The second region of the upper surface 241 may be coupled to the side plate 112 of the first body part 110.

The second body part 240 may include a protruded portion 242. The protruded portion 242 may be protruded from the upper surface 241. The protruded portion 242 may be protruded upward from the first region of the upper surface 241. The protruded portion 242 may be disposed in the second protruded portion 114 of the first body part 110. At least a portion of the protruded portion 242 may be in contact with the inclined surface 114a of the second protruded portion 114 of the first body part 110. The protruded portion 242 may be fusion-bonded with the second protruded portion 114 of the first body part 110. The protruded portion 242 may be fusion-bonded to the second protruded portion 114 of the first body part 110 by any one among ultrasonic welding, laser fusion, and thermal fusion.

The second body part 240 may include a side plate. The side plate may include: a first side plate 244; a second side plate 245; a third side plate 246 being disposed at an opposite side of the first side plate 244; and a fourth side plate 247 being disposed at an opposite side of the second side plate 245. The first to fourth side plates 244, 245, 246, and 247 may be coupled to the side plate 112 of the first body part 110. At this time, the side plates 112 of the first body part 110 and the side plates 244, 245, 246, and 247 of the second body part 240 may be disposed on the same plane. A groove 248 may be formed at an inner side surface of the side plates 244, 245, 246, and 247 of the first body part 240. The groove 248 may be continuously formed at inner side surfaces of the first to fourth side plates 244, 245, 246, and 247.

The second body part 240 may include a groove 248. The groove 248 may be formed by being recessed from a portion of the lower surface 243 of the second body part 240. The groove 248 may be formed by being recessed from a portion of the inner side surface of the side plate of the second body part 240.

The inner side surface of the second body part 240 may include: a first surface; a second surface being protruded more inward than the first surface; a third surface connecting the first surface and the second surface and orthogonal to the first surface and the second surface.

The groove 248 may be formed in the inner side surface of the side plate of the second body part 240. The groove 248 may include a first surface and a third surface of the second body part 240. The groove 248 may be coupled to the shield cover 300. The groove 248 may be fixed to the shield cover 300. The third surface of the groove 248 may be in contact with an upper surface of the side plate 320 of the shield cover 300. The first surface of the groove 248 may be in contact with an outer surface of the side plate 320 of the shield cover 300. In this case, a portion of the shield cover 300 being in contact with the groove 248 may be subjected to a metal surface treatment. Through this, interfacial separation between the shield cover 300 and the second body part 240 may be prevented. It is possible to maximize the bonding force and adhesion between the shield cover 300 and the second body part 240. In addition, through this, the gap between the shield cover 300 and the second body part 240 may be minimized to perform a waterproof function.

The second body part 240 may be coupled to an upper portion of the side plate 320 of the shield cover 300 by insert injection. The groove 248 of the second body part 240 and the upper portion of the side plate 320 of the shield cover 300 may be insert-injected. Hereinafter, insert injection between the second body part 240 and the shield cover 300 may be referred to as a primary insert injection.

The second body 200 may include a connector lead-out part 230. The connector lead-out part 230 may be coupled to the bottom plate 310 of the shield cover 300. The connector lead-out part 230 may be disposed in the hole 311 of the bottom plate 310 of the shield cover 300. The connector lead-out part 230 may penetrate through the hole 311 of the bottom plate 310 of the shield cover 300. Inside the connector lead-out part 230, a connector 460 may be disposed. The connector lead-out part 230 may be formed of a plastic material.

The connector lead-out part 230 may include a first portion 232 being disposed in the hole 311 of the bottom plate 310 of the shield cover 300. The connector lead-out part 230 may include a second portion 233 disposed below the bottom plate 310 of the shield cover 300. The first portion 232 may be protruded upward from a portion of the upper surface facing the bottom plate 310 of the shield cover 300 of the second portion 233. The diameter of the first portion 232 in a direction perpendicular to the optical axis direction may be smaller than the diameter in a direction perpendicular to the optical axis direction of the second portion 233. In this case, the insert-injected bonding surface between the connector lead-out part 230 and the shield cover 300 may be maximized. Through this, the shield cover 300 and the connector lead-out part 230 can be fixed more firmly, thereby preventing the penetration of moisture. That is, the waterproof function can be maximized. The diameter of the outer circumferential surface of the first portion 232 in a direction perpendicular to the optical axis direction may be the same as the diameter of the hole 311 of the bottom plate 310 of the shield cover 300 in the corresponding direction. The first portion 232 may be inserted into the hole 311 of the bottom plate 310 of the shield cover 300. The first portion 232 may be coupled to the hole 311 of the bottom plate 310 of the shield cover 300 by insert injection. The upper surface of the second portion 233 may be coupled to a lower surface of the bottom plate 310 of the shield cover 300. The upper surface of the second part 233 may be coupled to a lower surface of the bottom plate 310 of the shield cover 300 by insert injection. In this case, the bonding surface of the shield cover 300 with the connector lead-out part 230 may be treated with a metal surface. Hereinafter, insert injection between the shield cover 300 and the connector lead-out part 230 may be referred to as secondary insert injection.

The primary insert injection may be performed before the secondary insert injection. Or, the secondary insert injection may be performed before the primary insert injection.

The first portion 232 and the second portion 233 of the connector lead-out part 230 may be integrally formed. The length of the first portion 232 of the connector lead-out part 230 in an optical axis direction may be smaller than the length of the second part 233 of the connector lead-out part 230 in an optical axis direction. The length in the optical axis direction of the first portion 232 may correspond to the thickness of the bottom plate 310 of the shield cover 300. The upper surface of the first part 232 may be disposed on the same plane as the upper surface of the bottom plate 310 of the shield cover 300.

The connector lead-out part 230 may include a hole 231. A connector 460 may be disposed in the hole 231. The hole 231 may accommodate at least a portion of the connector 460. Through this, the connector lead-out part 230 may fix the connector 460.

The difference between the camera module 20 according to another embodiment of the present invention and the camera module 10 according to an embodiment lies in that the camera module 20 according to another embodiment maximizes the external exposure of the metal shield cover 300, thereby maximizing the heat dissipation effect.

The camera module 20 may include a shield cover 300. The shield cover 300 may be coupled to the second body part 240. An upper portion of the shield cover 300 may be coupled to the second body part 240. At least a portion of the shield cover 300 may be attached to the second body part 240. The shield cover 300 may be formed of a metal material.

The shield cover 300 may include a bottom plate 310 and a side plate 321 being extended from the bottom plate 310. The side plate 321 of the shield cover 300 may include: a first portion being overlapped with at least a portion of the second body part 240 in a direction perpendicular to the optical axis direction; and a second portion being extended from the first portion and not being overlapped with the second body part 240 in a direction perpendicular to the optical axis direction.

The first portion of the shield cover 300 may be attached to at least a portion of the second body part 240. The first portion may be disposed in the groove 248 of the second body part 240. The first portion of the shield cover 300 may be attached to the groove 248 of the second body part 240. A surface facing the first surface of the groove 248 of the first portion of the shield cover 300 may be attached to a first surface of the groove 248. A surface facing the third surface of the groove 248 of the first portion of the shield cover 300 may be attached to a third surface of the groove 248. The first portion of the shield cover 300 may be treated with a metal surface. Among the first portions of the shield cover 300, portions facing the first surface of the groove 248 and the third surface of the groove 248 may be subjected to metal surface treatment.

The second portion of the shield cover 300 may be exposed to the outside. The length of the second portion of the shield cover 300 in the optical axis direction may be greater than the length of the shield cover 300 in a direction corresponding to the first portion. Through this, it is possible to maximize the heat dissipation performance by maximizing the exposed region of the shield cover 300.

Hereinafter, a heat dissipation path of the camera modules 10 and 20 according to an embodiment and another embodiment of the present invention will be described in detail with reference to the drawings.

Figure 33:
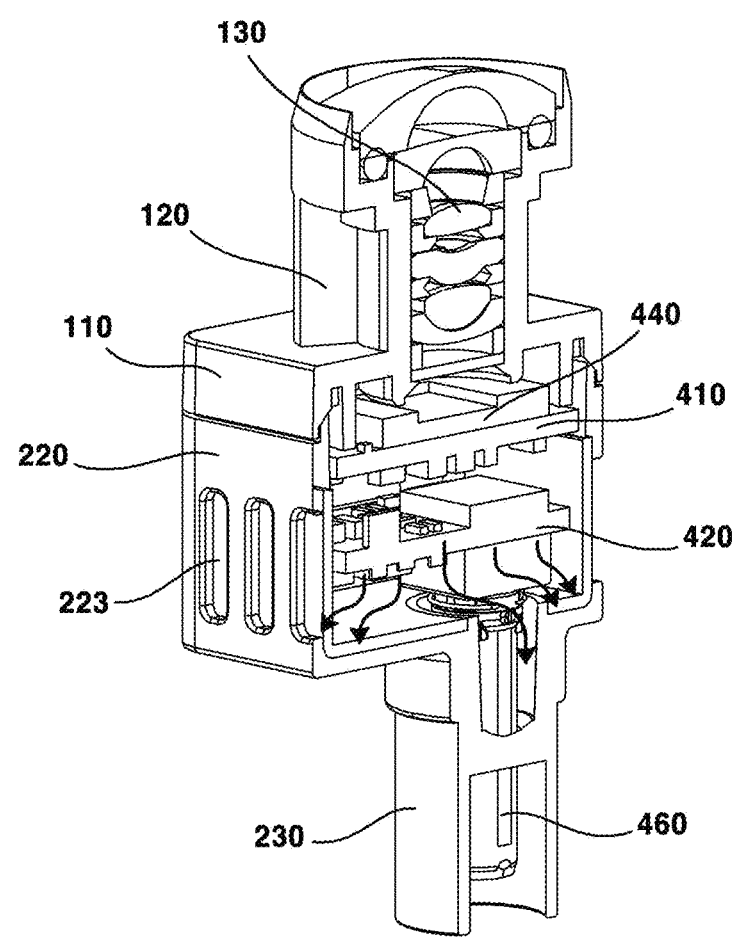
FIG. 33 is a diagram illustrating a heat dissipation path of a camera module according to an embodiment and another embodiment of the present invention.

FIG. 33 is a diagram illustrating a heat dissipation path of a camera module according to an embodiment and another embodiment of the present invention.

Recently, the number of substrates embedded in the camera module increases according to the demand for high resolution of small camera modules, and there is a problem in that the plastic body is damaged and parts such as the image sensor are damaged due to the heat generated from the substrate.

Referring to FIG. 33, in a camera module 10 according to the present invention, heat generated from the substrate is transferred to the shield cover 300 made of metal, and the heat transferred to the shield cover 300 may be discharged to the outside of the camera module 10 through the holes 211 and 223 of the second body 200. In addition, in a camera module 20 according to the present invention, the heat generated from the substrate is transferred to any one of the heat dissipation member 600 and the metal shield cover 300, the heat transferred to the shield cover 300 is emitted to the outside of the camera module 10 through the holes 211 and 223 of the second body 200, and the heat transferred to the heat dissipation member 600 may be transferred to the shield cover 300 and may be discharged to the outside of the camera module 10 through the holes 211 and 223 of the second body 200.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

What is claimed is:

1. A camera module comprising:

a first body comprising a lens;

a second body coupled to the first body and comprising a hole; and a shield cover disposed in the second body, wherein the shield cover is attached to the second body, wherein the second body and the shield cover are formed of different material, wherein a portion of a side plate of the shield cover is exposed by the hole of the second body, wherein the second body comprises a bottom plate and a side plate extended from the bottom plate in a direction toward the first body, wherein the side plate of the second body comprises a first region being attached to the shield cover, and a second region not being attached to the shield cover and the first body, and wherein a thickness of the second region of the second body is greater than a thickness of the first region of the second body.

2. The camera module according to claim 1, wherein the second body is formed of a plastic material, and wherein the shield cover is formed of a metal material.

3. The camera module according to claim 1, wherein the shield cover is insert-injected into the second body.

4. The camera module according to claim 1, wherein a bonding surface of the shield cover attaching the shield cover to the second body comprises a surface treatment layer.

5. The camera module according to claim 1, wherein a bonding surface of the shield cover attaching the shield cover to the second body is formed with nano-sized pores.

6. The camera module according to claim 1, wherein a bonding surface of the shield cover attaching the shield cover to the second body comprises a coating layer or a film layer.

7. The camera module according to claim 1, wherein an inner side surface of the second region of the side plate of the second body is protruded more inward than an inner side surface of the first region of the side plate of the second body.

8. The camera module according to claim 7, wherein an inner side surface of the first region and an inner side surface of the second region of the side plate of the second body comprise a step structure.

9. The camera module according to claim 8, wherein a sum of a thickness of the side plate of the shield cover and a thickness of the first region of the side plate of the second body is greater than a thickness of the second region.

10. The camera module according to claim 9, wherein an inner side surface of the side plate of the shield cover is protruded more inward than an inner side surface of the first region of the side plate of the second body.

11. The camera module according to claim 8, wherein a thickness of the side plate of the shield cover is thinner than a thickness of the second region of the side plate of the second body.

12. The camera module according to claim 11, wherein a width between inner side surfaces of the first region of the second body facing each other is greater than a width between inner side surfaces of the second region of the second body facing each other.

13. The camera module according to claim 7, wherein the shield cover comprises a bottom plate disposed in the bottom plate of the second body, and a side plate disposed in the side plate of the first body, and wherein the side plate of the shield cover is disposed in the first region of the second body.

14. The camera module according to claim 1, wherein the hole of the second body comprises a first hole formed in the bottom plate of the second body, and a second hole formed in the side plate of the second body, and wherein a shape of the first hole is different from a shape of the second hole.

15. The camera module according to claim 14, wherein the side plate of the second body comprises a first side plate, a second side plate, a third side plate disposed at an opposite side of the first side plate, and a fourth side plate disposed at an opposite side of the second side plate, wherein a plurality of the second holes are formed in each of the first to fourth side plates, wherein the second hole is disposed in a direction perpendicular to an optical axis, and wherein a length of the first side plate in a direction perpendicular to an optical axis direction is 1.5 to 2.5 times a sum of a lengths of the plurality of second holes formed in the first side plate in a direction perpendicular to the optical axis.

16. The camera module according to claim 15, wherein a cross-sectional area of the first side plate is 3 to 5 times a total area of the plurality of second holes formed in the first side plate.

17. The camera module according to claim 14, wherein the shield cover comprises a bottom plate disposed in the bottom plate of the second body, and a side plate extended from the bottom plate of the shield cover and disposed on the side plate of the second body, wherein at least a portion of the bottom plate of the shield cover is exposed by the first hole of the second body, and wherein at least a portion of the side plate of the shield cover is exposed through the second hole of the second body.

18. The camera module according to claim 1, further comprising a board assembly comprising a first substrate coupled to the first body, a second substrate disposed below the first substrate, a spacer separating the first substrate and the second substrate, and a third substrate electrically connecting the first substrate and the second substrate.

19. A camera module comprising:

a first body comprising a lens;

a second body coupled to the first body and comprising a hole, and a shield cover disposed in the second body and coupled to the second body, wherein the shield cover is attached to the second body, wherein a portion of a side plate of the shield cover is exposed by the hole of the second body, wherein the second body comprises a bottom plate and a side plate extended from the bottom plate in a direction toward the first body, wherein the side plate of the second body comprises a first region being attached to the shield cover, and a second region not being attached to the shield cover and the first body, and wherein a thickness of the second region of the second body is greater than a thickness of the first region of the second body.

* * * * *